United States Patent
Yasui et al.

(10) Patent No.: US 9,809,729 B2
(45) Date of Patent: Nov. 7, 2017

(54) PRESSURE-SENSITIVE ADHESIVE LAYER FOR OPTICAL APPLICATIONS, PRESSURE-SENSITIVE ADHESIVE LAYER-ATTACHED OPTICAL FILM, AND IMAGE DISPLAY DEVICE

(71) Applicant: NITTO DENKO CORPORATION, Ibaraki-shi, Osaka (JP)

(72) Inventors: Atsushi Yasui, Ibaraki (JP); Yuusuke Toyama, Ibaraki (JP); Takaaki Ishii, Ibaraki (JP); Shinsuke Akizuki, Ibaraki (JP)

(73) Assignee: NITTO DENKO CORPORATION, Osaka (JP)

( * ) Notice: Subject to any disclaimer, the term of this patent is extended or adjusted under 35 U.S.C. 154(b) by 0 days.

(21) Appl. No.: 14/301,486

(22) Filed: Jun. 11, 2014

(65) Prior Publication Data
US 2014/0377550 A1    Dec. 25, 2014

(30) Foreign Application Priority Data
Jun. 21, 2013 (JP) .................... 2013-130713

(51) Int. Cl.
*G02B 5/30* (2006.01)
*C08K 3/16* (2006.01)
*C09J 7/02* (2006.01)
*C09J 133/08* (2006.01)

(52) U.S. Cl.
CPC .......... *C09J 7/0217* (2013.01); *C09J 133/08* (2013.01); *C08K 3/16* (2013.01); *C09J 2203/318* (2013.01); *C09J 2205/102* (2013.01); *G02B 5/3033* (2013.01); *Y10T 428/2848* (2015.01); *Y10T 428/2891* (2015.01)

(58) Field of Classification Search
None
See application file for complete search history.

(56) References Cited

U.S. PATENT DOCUMENTS

| | | | |
|---|---|---|---|
| 2006/0088670 A1* | 4/2006 | Kim | C09J 133/08 428/1.31 |
| 2009/0110849 A1 | 4/2009 | Nishina | |
| 2009/0316086 A1 | 12/2009 | Ishii et al. | |
| 2010/0182546 A1 | 7/2010 | Maezawa et al. | |
| 2010/0277675 A1* | 11/2010 | Higashi | G02B 1/105 349/96 |
| 2010/0284072 A1* | 11/2010 | Saitou | C09J 7/0217 359/485.01 |
| 2013/0160938 A1 | 6/2013 | Yasui et al. | |

FOREIGN PATENT DOCUMENTS

| | | |
|---|---|---|
| JP | H03103801 A | 4/1991 |
| JP | 2003-246874 A | 9/2003 |
| JP | 2007-298958 A | 11/2007 |
| JP | 2008-197310 A | 8/2008 |
| JP | 2009-251281 A | 10/2009 |
| JP | 2010-033033 A | 2/2010 |
| JP | 2011-017029 A | 1/2011 |
| WO | 2007/034533 A1 | 3/2007 |
| WO | 2012029471 A1 | 3/2012 |

OTHER PUBLICATIONS

Office Action dated Dec. 20, 2016, issued in Japanese Patent Application No. 2013-130713 with English machine translation (6 pages).
Submission of Information dated May 17, 2017 submitted for Japanese Patent Application No. JP2013-130713; with tanslation.
Office Action dated Jul. 28, 2017, issued in Japanese Patent Application No. 2013-130713 with English machine translation.
Office Action dated Jul. 21, 2017, issued in Taiwanese Patent Application No. 103113548 with English machine translation.

* cited by examiner

*Primary Examiner* — Frank D Ducheneaux
(74) *Attorney, Agent, or Firm* — Westerman, Hattori, Daniels & Adrian, LLP

(57) ABSTRACT

A pressure-sensitive adhesive layer for optical applications of the present invention is made from a pressure-sensitive adhesive for optical applications including a base polymer (A), and the pressure-sensitive adhesive layer for optical applications includes iodine and/or iodide ions (B). The pressure-sensitive adhesive layer for optical applications has an antistatic function and can satisfy a durability.

12 Claims, No Drawings

PRESSURE-SENSITIVE ADHESIVE LAYER FOR OPTICAL APPLICATIONS, PRESSURE-SENSITIVE ADHESIVE LAYER-ATTACHED OPTICAL FILM, AND IMAGE DISPLAY DEVICE

BACKGROUND OF THE INVENTION

Field of the Invention

The present invention relates to a pressure-sensitive adhesive layer for optical applications and to a pressure-sensitive adhesive layer-attached optical film having the pressure-sensitive adhesive layer for optical applications.

Examples of the optical film used in the pressure-sensitive adhesive layer-attached optical film of the present invention include a polarizing film, a retardation plate, an optical compensation film, a brightness enhancement film, and a laminate of any combination thereof. The pressure-sensitive adhesive layer-attached optical film of the present invention is suitable for use in optical applications and may be used, for example, in applications for manufacturing image display devices such as liquid crystal display devices, organic electroluminescence (EL) display devices, plasma display panels (PDPs), and electronic paper, and input devices such as touch panels.

Description of the Related Art

The image-forming system of liquid crystal displays or the like requires polarizing elements to be placed on both sides of a liquid crystal cell, and generally polarizing films are bonded thereto. When the polarizing films are bonded to a liquid crystal cell, pressure-sensitive adhesives are generally used. Bonding between an optical film and a liquid crystal cell or between polarizing films is generally performed with a pressure-sensitive adhesive in order to reduce optical loss. In such a case, a pressure-sensitive adhesive layer-attached polarizing film including an optical film and a pressure-sensitive adhesive layer previously formed on one side of the polarizing film is generally used, because it has some advantages such as no need for a drying process to fix the optical film. In general, a release film is attached to the pressure-sensitive adhesive layer of the pressure-sensitive adhesive layer-attached polarizing film.

During the manufacture of a liquid crystal display, the pressure-sensitive adhesive layer-attached optical film is bonded to a liquid crystal cell. In this process, static electricity is generated when the release film is peeled off from the pressure-sensitive adhesive layer of the pressure-sensitive adhesive layer-attached polarizing film. The static electricity generated in this manner may affect the orientation of the liquid crystal in the liquid crystal display to cause a failure. The static electricity may also cause display unevenness when the liquid crystal display operates. For example, the static generation can be suppressed when an antistatic layer is formed on the outer surface of the optical film, but its effect is not high, and there is a problem in which static generation cannot be fundamentally prevented. To suppress static generation in a fundamental position, therefore, the pressure-sensitive adhesive layer is required to have an antistatic function. Concerning means for providing an antistatic function to a pressure-sensitive adhesive layer, for example, it is proposed that an ionic compound should be added to a pressure-sensitive adhesive used to form a pressure-sensitive adhesive layer (Patent Documents 1 and 2).

Patent Document 1 discloses that an ionic solid including an imidazolium cation and an inorganic anion is added to an acryl-based pressure-sensitive adhesive for use on polarizing films. Patent Document 2 discloses that an organic molten salt, such as an onium salt, which is in a liquid state at room temperature and includes a quaternary nitrogen atom-containing cation of 6 to 50 carbon atoms and a fluorine atom-containing anion, is added to an acryl-based pressure-sensitive adhesive for use on polarizing films. There is also proposed a method in which a conductive polymer such as polythiophene is used as a binder to form an antistatic layer between a polarizing film and a pressure-sensitive adhesive layer (Patent Document 3). The pressure-sensitive adhesive layer-attached polarizing film also needs to be durable in the state of adhesion.

PRIOR ART DOCUMENTS

Patent Documents

Patent Document 1: JP-A-2009-251281
Patent Document 2: WO 2007/034533 A
Patent Document 3: JP-A-2003-246874

SUMMARY OF THE INVENTION

Patent Documents 1 and 2 disclose that a pressure-sensitive adhesive layer made from a pressure-sensitive adhesive composition containing an ionic compound is applied onto a polarizing film to provide an antistatic function. Unfortunately, when the conventional pressure-sensitive adhesive composition containing an ionic compound is used to provide an antistatic function, a relatively large amount of the ionic compound needs to be added, which can have an adverse effect, such as a reduction in durability, on the properties of the pressure-sensitive adhesive. When a layer containing a conductive polymer such as polythiophene is provided between a polarizing film and a pressure-sensitive adhesive layer as disclosed in Patent Document 3, the number of processes increases, and an increase in cost occurs because the conductive polymer is expensive.

A pressure-sensitive adhesive layer-attached polarizing film including a polarizer, a transparent protective film provided only on one side of the polarizer, and a pressure-sensitive adhesive layer provided on the other side of the polarizer with no transparent protective film is used in some cases. This pressure-sensitive adhesive layer-attached polarizing film, which has a transparent protective film only on one side, can be cheaper than that having transparent protective films on both sides, because the cost of a layer of transparent protective film can be saved. However, when the pressure-sensitive adhesive layer contains an ionic compound, the ionic compound in the pressure-sensitive adhesive layer can affect the polarizer and the adhesive properties. For example, the use of a large amount of an ionic liquid and an ionic solid as ionic compounds may cause degradation of the polarizer and defects such as a reduction in optical durability or peeling at high temperature and high humidity.

An object of the present invention is to provide a pressure-sensitive adhesive layer for optical applications that has an antistatic function and can satisfy a durability.

An object of the present invention is also to provide a pressure-sensitive adhesive layer-attached optical film having the pressure-sensitive adhesive layer for optical applications, and a further object of the present invention is to provide an image display device including the pressure-sensitive adhesive layer-attached optical film.

As a result of investigations for solving the problems, the inventors have found the pressure-sensitive adhesive layer for optical applications described below and have completed the present invention.

The present invention relates to a pressure-sensitive adhesive layer for optical applications, which is made from a pressure-sensitive adhesive for optical applications including a base polymer (A), and the pressure-sensitive adhesive layer for optical applications includes iodine and/or iodide ions (B).

The pressure-sensitive adhesive layer for optical applications preferably includes 0.02 to 1 atomic % of the iodine and/or iodide ions (B).

In the pressure-sensitive adhesive layer for optical applications, the base polymer (A) is preferably a (meth)acryl-based polymer. The base polymer (A) also preferably includes a hydroxyl group. As the (meth)acryl-based polymer including an alkyl(meth)acrylate monomer unit and a hydroxyl group-containing monomer unit may be used.

The base polymer (A) also preferably includes a carboxyl group. As the (meth)acryl-based polymer including an alkyl (meth)acrylate monomer unit and a carboxyl group-containing monomer unit may be used.

In the pressure-sensitive adhesive layer for optical applications, when the (meth)acryl-based polymer includes butyl (meth)acrylate as the alkyl(meth)acrylate monomer unit, the content of the iodine and/or iodide ions (B) is preferably such that the ratio $I^-/C_3H_3O_2^-$ is from 0.01 to 3.

In the pressure-sensitive adhesive layer for optical applications, the pressure-sensitive adhesive for optical applications further may include an ionic compound (C). The ionic compound (C) is preferably an alkali metal salt and/or an organic cation-anion salt.

In the pressure-sensitive adhesive layer for optical applications, the pressure-sensitive adhesive for optical applications further may include an antioxidant (D).

In the pressure-sensitive adhesive layer for optical applications, the pressure-sensitive adhesive for optical applications further may include a crosslinking agent (E).

In the pressure-sensitive adhesive layer for optical applications, the pressure-sensitive adhesive for optical applications further may include a silane coupling agent (F).

The present invention also relates to a pressure-sensitive adhesive layer-attached optical film, including an optical film; and the above pressure-sensitive adhesive layer for optical applications provided on at least one side of the optical film.

In the pressure-sensitive adhesive layer-attached optical film, preferable used optical film is a polarizing film. The polarizing film is preferably an iodine-based polarizing film including an iodine-based polarizer containing iodine and/or iodide ions (B) and a transparent protective film provided on at least one side of the iodine-based polarizer. The iodine-based polarizer preferably contains 3 to 10% by weight of the iodine and/or iodide ions (B). The polarizing film having the transparent protective film only on one side of the polarizer, and the pressure-sensitive adhesive layer for optical applications being provided on the polarizer opposite to a side on which the transparent protective film is provided may be used.

The present invention also relates to an image display device, including at least one piece of the above pressure-sensitive adhesive layer-attached optical film.

The pressure-sensitive adhesive layer of the present invention for optical applications is made from a pressure-sensitive adhesive for optical applications containing a base polymer (A), and contains iodine and/or iodide ions (B). It is conceivable that iodine in the pressure-sensitive adhesive layer can exist in the form of molecular iodine ($I_2$) and iodide ions ($I^-$, $I^{3-}$, $I^{5-}$) which are in an equilibrium state. When existing in an ionized form, the iodine and/or iodide ions (B) in the pressure-sensitive adhesive layer can reduce the surface resistance of the pressure-sensitive adhesive layer, so that antistatic performance can be imparted to the pressure-sensitive adhesive layer using a simple technique without increasing the number of processes. It is also conceivable that in the presence of iodide ions, cation components (such as potassium ions or other cation components) can stably exist in the pressure-sensitive adhesive layer, so that the cation components can provide ionic conductivity to improve the antistatic performance. Even though present in the pressure-sensitive adhesive layer, the iodine and/or iodide ions (B) will not reduce its durability.

In addition, iodide ions, which are polarized, have high polarity. Thus, when the base polymer (A) used has a polar group such as a hydroxyl group or a carboxyl group, the iodide ions can be stabilized. The antistatic function can be further improved by the addition of the ionic compound (C) in such a small amount as not to affect durability.

A polarizing film including a polarizer and a transparent protective film provided only on one side of the polarizer may be used as the optical film, and a pressure-sensitive adhesive layer may be provided on the surface of the polarizer opposite to its surface on which the transparent protective film is provided. In this case, the pressure-sensitive adhesive layer is brought into contact with the polarizer, so that the optical properties such as the degree of polarization may degrade when the pressure-sensitive adhesive layer contains the ionic compound (C). According to the present invention, the pressure-sensitive adhesive layer containing the iodine and/or iodide ions (B) can effectively provide antistatic properties without reducing the optical properties such as the degree of polarization even when containing the ionic compound (C).

DETAILED DESCRIPTION OF THE PREFERRED EMBODIMENTS

The pressure-sensitive adhesive layer of the present invention for optical applications is made from a pressure-sensitive adhesive for optical applications containing a base polymer (A), and contains (B) iodine and/or iodide ions.

Any of various pressure-sensitive adhesives may be used as the pressure-sensitive adhesive for optical applications, depending on the type of the base polymer (A). Examples include rubber-based pressure-sensitive adhesives, acryl-based pressure-sensitive adhesives, silicone-based pressure-sensitive adhesives, polyurethane-based pressure-sensitive adhesives, vinyl alkyl ether-based pressure-sensitive adhesives, polyvinyl alcohol-based pressure-sensitive adhesives, polyvinylpyrrolidone-based pressure-sensitive adhesives, polyacrylamide-based pressure-sensitive adhesives, and cellulose-based pressure-sensitive adhesives. The base polymer (A) with adhesive properties is selected depending on the type of the pressure-sensitive adhesive.

The base polymer (A) preferably has a polar group such as a hydroxyl group or a carboxyl group because iodide ions in the pressure-sensitive adhesive layer can be stabilized in the presence of such a polar group. A hydroxyl group is particularly preferred among these polar groups.

Among the pressure-sensitive adhesive adhesives, acryl-based pressure-sensitive adhesives are preferably used because they have a high level of optical transparency, weather resistance, heat resistance, and other resistance properties, and an appropriate level of wettability, cohesiveness, tackiness, and other pressure-sensitive adhesive properties. The acryl-based pressure-sensitive adhesive contains a (meth)acryl-based polymer as a base polymer. The (meth)acryl-based polymer includes an alkyl(meth)acrylate monomer unit as a main component. The term "(meth)acrylate" refers to acrylate and/or methacrylate, and "(meth)" is used in the same meaning in the description.

The alkyl(meth)acrylate used to form the main skeleton of the (meth)acryl-based polymer may have a straight- or branched-chain alkyl group of 1 to 18 carbon atoms. Examples of such an alkyl group include methyl, ethyl, propyl, isopropyl, butyl, isobutyl, amyl, hexyl, cyclohexyl, heptyl, 2-ethylhexyl, isooctyl, nonyl, decyl, isodecyl, dodecyl, isomyristyl, lauryl, tridecyl, pentadecyl, hexadecyl, heptadecyl, and octadecyl groups. These may be used singly or in any combination. The average number of carbon atoms in the alkyl group is preferably from 3 to 9.

An aromatic ring-containing alkyl(meth)acrylate such as phenoxyethyl(meth)acrylate or benzyl(meth)acrylate may also be used in view of control of adhesive properties, durability, retardation, refractive index, or the like. A polymer obtained by polymerizing the aromatic ring-containing alkyl(meth)acrylate may be used in a mixture with any of the above examples of the (meth)acryl-based polymer. In view of transparency, however, a copolymer obtained by polymerizing the aromatic ring-containing alkyl(meth)acrylate and the above alkyl(meth)acrylate is preferably used.

The content of the aromatic ring-containing alkyl(meth)acrylate component in the (meth)acryl-based polymer may be 50% by weight or less based on the content (100% by weight) of all the monomer components of the (meth)acryl-based polymer. The content of the aromatic ring-containing alkyl(meth)acrylate is preferably from 1 to 35% by weight, more preferably from 1 to 20% by weight, even more preferably from 7 to 18% by weight, still more preferably from 10 to 16% by weight.

In order to improve tackiness or heat resistance, one or more copolymerizable monomers having an unsaturated double bond-containing polymerizable functional group such as a (meth)acryloyl group or a vinyl group may be introduced into the (meth)acryl-based polymer by copolymerization. Examples of such copolymerizable monomers include hydroxyl group-containing monomers such as 2-hydroxyethyl(meth)acrylate, 3-hydroxypropyl(meth)acrylate, 4-hydroxybutyl(meth)acrylate, 6-hydroxyhexyl(meth)acrylate, 8-hydroxyoctyl(meth)acrylate, 10-hydroxydecyl(meth)acrylate, 12-hydroxylauryl(meth)acrylate, and (4-hydroxymethylcyclohexyl)-methyl acrylate; carboxyl group-containing monomers such as (meth)acrylic acid, carboxyethyl(meth)acrylate, carboxypentyl(meth)acrylate, itaconic acid, maleic acid, fumaric acid, and crotonic acid; acid anhydride group-containing monomers such as maleic anhydride and itaconic anhydride; caprolactone adducts of acrylic acid; sulfonic acid group-containing monomers such as styrenesulfonic acid, allylsulfonic acid, 2-(meth)acrylamido-2-methylpropanesulfonic acid, (meth)acrylamidopropanesulfonic acid, sulfopropyl(meth)acrylate, and (meth)acryloyloxynaphthalenesulfonic acid; and phosphate group-containing monomers such as 2-hydroxyethylacryloyl phosphate.

Examples of such a monomer for modification also include (N-substituted) amide monomers such as (meth)acrylamide, N,N-dimethyl(meth)acrylamide, N-butyl(meth)acrylamide, N-methylol(meth)acrylamide, and N-methylolpropane(meth)acrylamide; alkylaminoalkyl(meth)acrylate monomers such as aminoethyl(meth)acrylate, N,N-dimethylaminoethyl(meth)acrylate, and tert-butylaminoethyl(meth)acrylate; alkoxyalkyl(meth)acrylate monomers such as methoxyethyl(meth)acrylate and ethoxyethyl(meth)acrylate; succinimide monomers such as N-(meth)acryloyloxymethylenesuccinimide, N-(meth)acryloyl-6-oxyhexamethylenesuccinimide, N-(meth)acryloyl-8-oxyoctamethylenesuccinimide, and N-acryloylmorpholine; maleimide monomers such as N-cyclohexylmaleimide, N-isopropylmaleimide, N-laurylmaleimide, and N-phenylmaleimide; and itaconimide monomers such as N-methylitaconimide, N-ethylitaconimide, N-butylitaconimide, N-octylitaconimide, N-2-ethylhexylitaconimide, N-cyclohexylitaconimide, and N-laurylitaconimide.

Examples of modification monomers that may also be used include vinyl monomers such as vinyl acetate, vinyl propionate, N-vinylpyrrolidone, methylvinylpyrrolidone, vinylpyridine, vinylpiperidone, vinylpyrimidine, vinylpiperazine, vinylpyrazine, vinylpyrrole, vinyl imidazole, vinyloxazole, vinylmorpholine, N-vinylcarboxylic acid amides, styrene, α-methylstyrene, and N-vinylcaprolactam; cyanoacrylate monomers such as acrylonitrile and methacrylonitrile; epoxy group-containing acrylic monomers such as glycidyl(meth)acrylate; glycol acrylic ester monomers such as polyethylene glycol(meth)acrylate, polypropylene glycol (meth)acrylate, methoxyethylene glycol(meth)acrylate, and methoxypolypropylene glycol(meth)acrylate; and acrylate ester monomers such as tetrahydrofurfuryl(meth)acrylate, fluoro(meth)acrylate, silicone(meth)acrylate, and 2-methoxyethyl acrylate. Examples also include isoprene, butadiene, isobutylene, and vinyl ether.

Besides the above, a silicon atom-containing silane monomer may be exemplified as the copolymerizable monomer. Examples of the silane monomers include 3-acryloxypropyltriethoxysilane, vinyltrimethoxysilane, vinyltriethoxysilane, 4-vinylbutyltrimethoxysilane, 4-vinylbutyltriethoxysilane, 8-vinyloctyltrimethoxysilane, 8-vinyloctyltriethoxysilane, 10-methacryloyloxydecyltrimethoxysilane, 10-acryloyloxydecyltrimethoxysilane, 10-methacryloyloxydecyltriethoxysilane, and 10-acryloyloxydecyltriethoxysilane.

Copolymerizable monomers that may be used also include polyfunctional monomers having two or more unsaturated double bonds such as (meth)acryloyl groups or vinyl groups, which include (meth)acrylate esters of polyhydric alcohols, such as tripropylene glycol di(meth)acrylate, tetraethylene glycol di(meth)acrylate, 1,6-hexanediol di(meth)acrylate, bisphenol A diglycidyl ether di(meth)acrylate, neopentyl glycol di(meth)acrylate, trimethylolpropane tri(meth)acrylate, pentaerythritol tri(meth)acrylate, pentaerythritol tetra(meth)acrylate, dipentaerythritol penta(meth)acrylate, dipentaerythritol hexa(meth)acrylate, and caprolactone-modified dipentaerythritol hexa(meth)acrylate; and compounds having a polyester, epoxy or urethane skeleton to which two or more unsaturated double bonds are added in the form of functional groups such as (meth)acryloyl groups or vinyl groups in the same manner as the monomer component, such as polyester (meth)acrylates, epoxy(meth)acrylates and urethane(meth)acrylates.

Concerning the weight ratios of all monomer components, the alkyl(meth)acrylate should be a main component of the (meth)acryl-based polymer, and the content of the copolymerizable monomer used to form the (meth)acryl-based polymer is preferably, but not limited to, 0 to about 20%, more preferably about 0.1 to about 15%, even more preferably about 0.1 to about 10%, based on the total weight of all monomer components.

Among these copolymerizable monomers, a polar group-containing monomer such as a hydroxyl group-containing monomer or a carboxyl group-containing monomer is preferably used in view of tackiness, durability, and the stability of iodide ions. A hydroxyl group-containing monomer is particularly preferred. A hydroxyl group-containing monomer may be used in combination with a carboxyl group-containing monomer. When the pressure-sensitive adhesive for optical applications contains a crosslinking agent, these copolymerizable monomers can act as reactive sites to the crosslinking agent. A hydroxyl group-containing monomer, a carboxyl group-containing monomer, and the like are highly reactive with intermolecular crosslinking agents and therefore are preferably used to improve the cohesiveness or heat resistance of the resulting pressure-sensitive adhesive layer. A hydroxyl group-containing monomer is advantageous in providing reworkability, and a carboxyl group-containing monomer is advantageous in providing both durability and reworkability. The content of the polar group-containing monomer is preferably from about 0.01 to about 20%, more preferably from about 0.1 to about 10%, even more preferably from about 0.5 to about 7%, based on the total weight of all the monomers used to form the polymer.

When a hydroxyl group-containing monomer is added as a copolymerizable monomer, its content is preferably from 0.01 to 15% by weight, more preferably from 0.03 to 10% by weight, even more preferably from 0.05 to 7% by weight. When a carboxyl group-containing monomer is added as a copolymerizable monomer, its content is preferably from 0.05 to 10% by weight, more preferably from 0.1 to 8% by weight, even more preferably from 0.2 to 6% by weight.

In an embodiment of the present invention, the (meth)acryl-based polymer used generally has a weight average molecular weight in the range of 500,000 to 3,000,000. In view of durability, particularly in view of heat resistance, the weight average molecular weight of the (meth)acryl-based polymer used is preferably from 700,000 to 2,700,000, more preferably from 800,000 to 2,500,000. If the weight average molecular weight is less than 500,000, it is not preferred in view of heat resistance. If a weight average molecular weight is more than 3,000,000, it is not preferred because a large amount of a dilution solvent may be necessary for control of coating viscosity, which may increase cost. The weight average molecular weight refers to the value obtained by measurement by gel permeation chromatography (GPC) and conversion of the measured value into the polystyrene-equivalent value.

For the production of the (meth)acryl-based polymer, any appropriate method may be selected from known production methods such as solution polymerization, bulk polymerization, emulsion polymerization, and various radical polymerization methods. The resulting (meth)acryl-based polymer may be any type of copolymer such as a random copolymer, a block copolymer and a graft copolymer.

In a solution polymerization process, for example, ethyl acetate, toluene or the like is used as a polymerization solvent. In a specific solution polymerization process, for example, the reaction is performed under a stream of inert gas such as nitrogen at a temperature of about 50 to about 70° C. for about 5 to about 30 hours in the presence of a polymerization initiator.

Any appropriate polymerization initiator, chain transfer agent, emulsifying agent and so on may be selected and used for radical polymerization. The weight average molecular weight of the (meth)acryl-based polymer may be controlled by the reaction conditions including the amount of addition of the polymerization initiator or the chain transfer agent and monomers concentration. The amount of the addition may be controlled as appropriate depending on the type of these materials.

Examples of the polymerization initiator include, but are not limited to, azo initiators such as 2,2'-azobisisobutylonitrile, 2,2'-azobis(2-amidinopropane)dihydrochloride, 2,2'-azobis[2-(5-methyl-2-imidazoline-2-yl)propane]dihydrochlorid e, 2,2'-azobis(2-methylpropionamidine)disulfate, 2,2'-azobis(N,N'-dimethyleneisobutylamidine), and 2,2'-azobis[N-(2-carboxyethyl)-2-methylpropionamidine]hydrate (VA-057, manufactured by Wako Pure Chemical Industries, Ltd.); persulfates such as potassium persulfate and ammonium persulfate; peroxide initiators such as di(2-ethylhexyl)peroxydicarbonate, di(4-tert-butylcyclohexyl) peroxydicarbonate, di-sec-butylperoxydicarbonate, tert-butylperoxyneodecanoate, tert-hexylperoxypivalate, tert-butylperoxypivalate, dilauroyl peroxide, di-n-octanoyl peroxide, 1,1,3,3-tetramethylbutylperoxy-2-ethyl hexanoate, di(4-methylbenzoyl) peroxide, dibenzoyl peroxide, tert-butylperoxyisobutylate, 1,1-di(tert-hexylperoxy)cyclohexane, tert-butylhydroperoxide, and hydrogen peroxide; and redox system initiators of a combination of a peroxide and a reducing agent, such as a combination of a persulfate and sodium hydrogen sulfite and a combination of a peroxide and sodium ascorbate.

One of the above polymerization initiators may be used alone, or two or more thereof may be used in a mixture. The total content of the polymerization initiator is preferably from about 0.005 to 1 part by weight, more preferably from about 0.02 to about 0.5 parts by weight, based on 100 parts by weight of the monomer.

For example, when 2,2'-azobisisobutyronitrile is used as a polymerization initiator for the production of the (meth)acryl-based polymer with the above weight average molecular weight, the polymerization initiator is preferably used in a content of from about 0.06 to 0.2 parts by weight, more preferably of from about 0.08 to 0.175 parts by weight, based on 100 parts by weight of the total content of the monomer components.

Examples of the chain transfer agent include lauryl mercaptan, glycidyl mercaptan, mercaptoacetic acid, 2-mercaptoethanol, thioglycolic acid, 2-ethylhexyl thioglycolate, and 2,3-dimercapto-1-propanol. One of these chain transfer agents may be used alone, or two or more thereof may be used in a mixture. The total content of the chain transfer agent is preferably 0.1 parts by weight or less, based on 100 parts by weight of the total content of the monomer components.

Examples of the emulsifier used in emulsion polymerization include anionic emulsifiers such as sodium lauryl sulfate, ammonium lauryl sulfate, sodium dodecylbenzenesulfonate, ammonium polyoxyethylene alkyl ether sulfate, and sodium polyoxyethylene alkyl phenyl ether sulfate; and nonionic emulsifiers such as polyoxyethylene alkyl ether, polyoxyethylene alkyl phenyl ether, polyoxyethylene fatty acid ester, and polyoxyethylene-polyoxypropylene block polymers. These emulsifiers may be used alone, or two or more thereof may be used in combination.

The emulsifier may be a reactive emulsifier. Examples of such an emulsifier having an introduced radical-polymerizable functional group such as a propenyl group and an allyl ether group include Aqualon HS-10, HS-20, KH-10, BC-05, BC-10, and BC-20 (each manufactured by Dai-ichi Kogyo Seiyaku Co., Ltd.) and Adekaria Soap SE10N (manufactured by Asahi Denka Kogyo K.K.). The reactive emulsifier is preferred, because after polymerization, it can be incorporated into a polymer chain to improve water resistance.

Based on 100 parts by weight of the total monomer component, the emulsifier is preferably used in a content of 0.3 to 5 parts by weight, more preferably of 0.5 to 1 parts by weight, in view of polymerization stability or mechanical stability.

The content (the iodine content) of the iodine and/or iodide ions (B) in the pressure-sensitive adhesive layer of the present invention for optical applications can be determined using electron spectroscopy for chemical analysis (ESCA). Specifically, ESCA is performed using the method described in the examples below. The content (the iodine content) of the iodine and/or iodide ions (B) is preferably from 0.02 to 1 atomic % as determined using ESCA. If the content exceeds 1 atomic %, a defect such as the ability to corrode adjacent components may occur. The content is preferably from 0.02 to 0.5 atomic %, more preferably from 0.05 to 0.3 atomic %.

When the base polymer (A) used is a (meth)acryl-based polymer having a monomer unit derived from an alkyl (meth)acrylate including butyl(meth)acrylate, the content (the iodine content) of the iodine and/or iodide ions (B) in the pressure-sensitive adhesive layer of the present invention for optical applications can be determined using time-of-flight secondary ion mass spectrometry (TOF-SIMS) analysis. Specifically, TOF-SIMS analysis is performed using the method described in the examples below. The content (the iodine content) of the iodine and/or iodide ions (B) is preferably such that the ratio $I^-/C_3H_3O_2^-$ is from 0.01 to 3 as determined using TOF-SIMS analysis. If the content is such that the ratio $I^-/C_3H_3O_2^-$ exceeds 3, a defect such as the ability to corrode adjacent components may occur. The content is more preferably such that the ratio $I^-/C_3H_3O_2^-$ is from 0.01 to 1, even more preferably such that the ratio $I^-/C_3H_3O_2^-$ is from 0.01 to 2, further more preferably such that the ratio $I^-/C_3H_3O_2^-$ from 0.02 to 0.5, still more preferably such that the ratio $I^-/C_3H_3O_2^-$ is from 0.05 to 0.3.

The pressure-sensitive adhesive layer may be formed directly on an iodine-based polarizer. In this case, iodine and/or iodide ions (B) can be added from the iodine-based polarizer to the pressure-sensitive adhesive layer, and the content of the iodine and/or iodide ions (B) can be controlled by humidification, heating, or other methods after the pressure-sensitive adhesive layer is formed on the iodine-based polarizer. Alternatively, an excess amount of iodine or iodide ions may be added in the process of manufacturing the iodine-based polarizer (in the dyeing process) so that the content of the iodine or iodide ions can be controlled.

The pressure-sensitive adhesive layer of the present invention for optical applications contains iodine and/or iodide ions (B). The iodine and/or iodide ions (B) may be added to the base polymer (A) so that the pressure-sensitive adhesive for optical applications can contain the iodine and/or iodide ions (B). The iodine and/or iodide ions (B) may be added in the form of an aqueous solution. A solution of the iodine and/or iodide ions (B) dissolved in an organic solvent such as ethyl acetate or an alcohol may also be used. A mixed solution of the aqueous solution and the organic solvent may also be used.

Iodide ions may be added in the form of an aqueous solution of an iodide compound (aqueous iodine solution). For example, the iodide compound may be potassium iodide, lithium iodide, sodium iodide, zinc iodide, aluminum iodide, lead iodide, copper iodide, barium iodide, calcium iodide, tin iodide, titanium iodide, an iodine-based ionic liquid, an iodine-based ionic solid, or the like. In view of cost and performance, the iodide compound is advantageously potassium iodide.

The concentration of iodine in the aqueous iodine solution may be from about 0.01 to about 10% by weight, preferably from 0.02 to 5% by weight, more preferably from 0.02 to 0.5% by weight. The iodide compound is preferably used at a concentration of about 0.1 to about 10% by weight, more preferably at a concentration of 0.2 to 8% by weight. Iodine and the iodide may be mixed in any ratio.

The iodine and/or iodide ions (B) in the pressure-sensitive adhesive layer of the present invention for optical applications may also be added with a certain period of time. For example, a pressure-sensitive adhesive layer may be formed directly on an iodine-based polarizer containing the iodine and/or iodide ions (B) (specifically a pressure-sensitive adhesive layer-attached, iodine-based, polarizing film may be formed having a transparent protective film on only one side). In this case, the iodine and/or iodide ions (B) can be transferred from the iodine-based polarizer to the pressure-sensitive adhesive layer so that a pressure-sensitive adhesive layer containing the iodine and/or iodide ions (B) can be formed.

The pressure-sensitive adhesive for optical applications of the present invention may contain the ionic compound (C). The ionic compound (C) to be used is preferably an alkali metal salt and/or an organic cation-anion salt. Any of organic and inorganic salts of alkali metals may be used as the alkali metal salt. As used herein, the term "organic cation-anion salt" refers to an organic salt including an organic cation moiety, in which the anion moiety may be organic or inorganic. The "organic cation-anion salt" is also referred to as the ionic liquid or the ionic solid.

<Alkali Metal Salt>

The cation moiety of the alkali metal salt includes an alkali metal ion, which may be any of lithium, sodium, and potassium ions. Among these alkali metal ions, lithium ion is particularly preferred.

The anion moiety of the alkali metal salt may include an organic material or an inorganic material. Examples of the anion moiety that may be used to form the organic salt include $CH_3COO^-$, $CF_3COO^-$, $CH_3SO_3^-$, $CF_3SO_3^-$, $(CF_3SO_2)_3C^-$, $C_4F_9SO_3^-$, $C_3F_7COO^-$, $(CF_3SO_2)(CF_3CO)N^-$, $^-O_3S(CF_2)_3SO_3^-$, $PF_6^-$, and $CO_3^{2-}$, and those represented by the following general formulae (1) to (4):

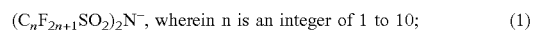

$(C_nF_{2n+1}SO_2)_2N^-$, wherein n is an integer of 1 to 10; (1)

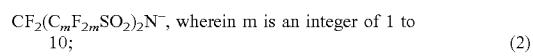

$CF_2(C_mF_{2m}SO_2)_2N^-$, wherein m is an integer of 1 to 10; (2)

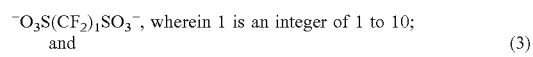

$^-O_3S(CF_2)_lSO_3^-$, wherein l is an integer of 1 to 10; and (3)

$(C_pF_{2p+1}SO_2)N^-(C_qF_{2q+1}SO_2)$, (4)

wherein p and q are each an integer of 1 to 10. In particular, a fluorine atom-containing anion moiety is preferably used because it can form an ionic compound with good ionic dissociation properties. Examples of the anion moiety that may be used to form the inorganic salt include $Cl^-$, $Br^-$, $I^-$, $AlCl_4^-$, $Al_2Cl_7^-$, $BF_4^-$, $PF_6^-$, $ClO_4^-$, $NO_3^-$, $AsF_6^-$, $SbF_6^-$, $NbF_6^-$, $TaF_6^-$, and $(CN)_2N^-$. The anion moiety is preferably (perfluoroalkylsulfonyl) imide represented by the general formula (1), such as $(CF_3SO_2)_2N^-$ or $(C_2F_5SO_2)_2N^-$, in particular, preferably (trifluoromethanesulfonyl) imide such as $(CF_3SO_2)_2N^-$.

Examples of organic salts of alkali metals include sodium acetate, sodium alginate, sodium lignosulfonate, sodium toluenesulfonate, $LiCF_3SO_3$, $Li(CF_3SO_2)_2N$, $Li(CF_3SO_2)_2N$, $Li(C_2F_5SO_2)_2N$, $Li(C_4F_9SO_2)_2N$, $Li(CF_3SO_2)_3C$, $KO_3S(CF_2)_3SO_3K$, and $LiO_3S(CF_2)_3SO_3K$.

Among them, LiCF$_3$SO$_3$, Li(CF$_3$SO$_2$)$_2$N, Li(C$_2$F$_5$SO$_2$)$_2$N, Li(C$_4$F$_9$SO$_2$)$_2$N, Li(CF$_3$SO$_2$)$_3$C, and the like are preferred, fluorine-containing lithium imide salts such as Li(CF$_3$SO$_2$)$_2$N, Li(C$_2$F$_5$SO$_2$)$_2$N, and Li(C$_4$F$_9$SO$_2$)$_2$N are more preferred, and a (perfluoroalkylsulfonyl) imide lithium salt is particularly preferred.

Examples of inorganic salts of alkali metals include lithium perchlorate and lithium iodide.

<Organic Cation-Anion Salt>

The organic cation-anion salt that may be used in the present invention includes a cationic component and an anionic component, in which the cationic component includes an organic material. Examples of the cationic component include a pyridinium cation, a piperidinium cation, a pyrrolidinium cation, a pyrroline skeleton-containing cation, a pyrrole skeleton-containing cation, an imidazolium cation, a tetrahydropyridinium cation, a dihydropyridinium cation, a pyrazolium cation, a pyrazolinium cation, a tetraalkylammonium cation, a trialkylsulfonium cation, and a tetraalkylsulfonium cation.

Examples of the anionic component that may be used include Cl$^-$, Br$^-$, I$^-$, AlCl$_4^-$, Al$_2$Cl$_7^-$, BF$_4^-$, PF$_6^-$, ClO$_4^-$, NO$_3^-$, CH$_3$COO$^-$, CF$_3$COO$^-$, CH$_3$SO$_3^-$, CF$_3$SO$_3^-$, (CF$_3$SO$_2$)$_3$C$^-$, AsF$_6^-$, SbF$_6^-$, NbF$_6^-$, TaF$_6^-$, (CN)$_2$N$^-$, C$_4$F$_9$SO$_3^-$, C$_3$F$_7$COO$^-$, (CF$_3$SO$_2$)(CF$_3$CO)N$^-$, and $^-$O$_3$S(CF$_2$)$_3$SO$_3^-$, and those represented by the following general formulae (1) to (4):

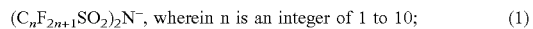

(C$_n$F$_{2n+1}$SO$_2$)$_2$N$^-$, wherein n is an integer of 1 to 10; (1)

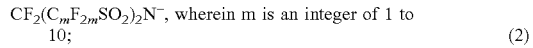

CF$_2$(C$_m$F$_{2m}$SO$_2$)$_2$N$^-$, wherein m is an integer of 1 to 10; (2)

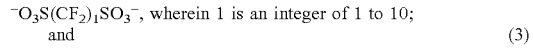

$^-$O$_3$S(CF$_2$)$_l$SO$_3^-$, wherein l is an integer of 1 to 10; and (3)

(C$_p$F$_{2p+1}$SO$_2$)N$^-$(C$_q$F$_{2q+1}$SO$_2$), (4)

wherein p and q are each an integer of 1 to 10. In particular, a fluorine atom-containing anionic component is preferably used because it can form an ionic compound with good ionic dissociation properties.

Examples of the organic cation-anion salt that may be used include compounds appropriately selected from combinations of the above cationic and anionic components.

Examples thereof include, such as 1-butylpyridinium tetrafluoroborate, 1-butylpyridinium hexafluorophosphate, 1-butyl-3-methylpyridinium tetrafluoroborate, 1-butyl-3-methylpyridinium trifluoromethanesulfonate, 1-butyl-3-methylpyridinium bis(trifluoromethanesulfonyl)imide, 1-butyl-3-methylpyridinium bis(pentafluoroethanesulfonyl)imide, 1-hexylpyridinium tetrafluoroborate, 2-methyl-1-pyrroline tetrafluoroborate, 1-ethyl-2-phenylindole tetrafluoroborate, 1,2-dimethylindole tetrafluoroborate, 1-ethylcarbazole tetrafluoroborate, 1-ethyl-3-methylimidazolium tetrafluoroborate, 1-ethyl-3-methylimidazolium acetate, 1-ethyl-3-methylimidazolium trifluoroacetate, 1-ethyl-3-methylimidazolium heptafluorobutyrate, 1-ethyl-3-methylimidazolium trifluoromethanesulfonate, 1-ethyl-3-methylimidazolium perfluorobutanesulfonate, 1-ethyl-3-methylimidazolium dicyanamide, 1-ethyl-3-methylimidazolium bis(trifluoromethanesulfonyl)imide, 1-ethyl-3-methylimidazolium bis(pentafluoroethanesulfonyl)imide, 1-ethyl-3-methylimidazoliumtris(trifluoromethanesulfonyl)methide, 1-butyl-3-methylimidazolium tetrafluoroborate, 1-butyl-3-methylimidazolium hexafluorophosphate, 1-butyl-3-methylimidazolium trifluoroacetate, 1-butyl-3-methylimidazolium heptafluorobutyrate, 1-butyl-3-methylimidazolium trifluoromethanesulfonate, 1-butyl-3-methylimidazolium perfluorobutanesulfonate, 1-butyl-3-methylimidazolium bis(trifluoromethanesulfonyl)imide, 1-hexyl-3-methylimidazolium bromide, 1-hexyl-3-methylimidazolium chloride, 1-hexyl-3-methylimidazolium tetrafluoroborate, 1-hexyl-3-methylimidazolium hexafluorophosphate, 1-hexyl-3-methylimidazolium trifluoromethanesulfonate, 1-octyl-3-methylimidazolium tetrafluoroborate, 1-octyl-3-methylimidazolium hexafluorophosphate, 1-hexyl-2,3-dimethylimidazolium tetrafluoroborate, 1,2-dimethyl-3-propylimidazolium bis(trifluoromethanesulfonyl)imide, 1-metylpyrazolium tetrafluoroborate, 3-methylpyrazolium tetrafluoroborate, tetrahexylammonium bis(trifluoromethanesulfonyl)imide, diallyldimethylammonium tetrafluoroborate, diallyldimethylammonium trifluoromethanesulfonate, diallyldimethylammonium bis(trifluoromethanesulfonyl)imide, diallyldimethylammonium bis(pentafluoroethanesulfonyl)imide, N,N-diethyl-N-methyl-N-(2-methoxyethyl)ammoniumtetrafluoroborate, N,N-diethyl-N-methyl-N-(2-methoxyethyl)ammonium trifluoromethanesulfonate, N,N-diethyl-N-methyl-N-(2-methoxyethyl)ammonium bis(trifluoromethanesulfonyl)imide, N,N-diethyl-N-methyl-N-(2-methoxyethyl)ammonium bis(pentafluoroethanesulfonyl)imide, glycidyltrimethylammonium trifluoromethanesulfonate, glycidyltrimethylammonium bis(trifluoromethanesulfonyl)imide, glycidyltrimethylammonium bis(pentafluoroethanesulfonyl)imide, 1-butylpyridinium (trifluoromethanesulfonyl)trifluoroacetamide, 1-butyl-3-methylpyridinium (trifluoromethanesulfonyl)trifluoroacetamide, 1-ethyl-3-methylimidazolium (trifluoromethanesulfonyl)trifluoroacetamide, N,N-diethyl-N-methyl-N-(2-methoxyethyl)ammonium (trifluoromethanesulfonyl)trifluoroacetamide, diallyldimethylammonium (trifluoromethanesulfonyl)trifluoroacetamide, glycidyltrimethylammonium (trifluoromethanesulfonyl)trifluoroacetamide, N,N-dimethyl-N-ethyl-N-propylammonium bis(trifluoromethanesulfonyl)imide, N,N-dimethyl-N-ethyl-N-butylammonium bis(trifluoromethanesulfonyl)imide, N,N-dimethyl-N-ethyl-N-pentylammonium bis(trifluoromethanesulfonyl)imide, N,N-dimethyl-N-ethyl-N-hexylammonium bis(trifluoromethanesulfonyl)imide, N,N-dimethyl-N-ethyl-N-heptylammonium bis(trifluoromethanesulfonyl)imide, N,N-dimethyl-N-ethyl-N-nonylammonium bis(trifluoromethanesulfonyl)imide, N,N-dimethyl-N,N-dipropylammonium bis(trifluoromethanesulfonyl)imide, N,N-dimethyl-N-propyl-N-butylammonium bis(trifluoromethanesulfonyl)imide, N,N-dimethyl-N-propyl-N-pentylammonium bis(trifluoromethanesulfonyl)imide, N,N-dimethyl-N-propyl-N-hexylammonium bis(trifluoromethanesulfonyl)imide, N,N-dimethyl-N-propyl-N-heptylammonium bis(trifluoromethanesulfonyl)imide, N,N-dimethyl-N-butyl-N-hexylammonium bis(trifluoromethanesulfonyl)imide, N,N-dimethyl-N-butyl-N-heptylammonium bis(trifluoromethanesulfonyl)imide, N,N-dimethyl-N-pentyl-N-hexylammonium bis(trifluoromethanesulfonyl)imide, N,N-dimethyl-N,N-dihexylammonium bis(trifluoromethanesulfonyl)imide, trimethylheptylammonium bis(trifluoromethanesulfonyl)imide, N,N-diethyl-N-methyl-N-propylammonium bis(trifluoromethanesulfonyl)imide, N,N-diethyl-N-methyl-N-pentylammonium bis(trifluoromethanesulfonyl)imide, N,N-diethyl-N-methyl-N-heptylammonium bis(trifluoromethanesulfonyl)imide, N,N-diethyl-N-propyl-N-pentylammonium bis(trifluoromethanesulfonyl)imide, triethylpropylammonium bis(trifluoromethanesulfonyl)imide, triethylpentylammonium bis(trifluoromethanesulfonyl)imide, triethylheptylammonium bis(trifluoromethanesulfonyl)imide, N,N-dipropyl-N-methyl-N-ethylammonium bis(trifluoromethanesulfonyl)imide, N,N-dipropyl-N-methyl-N-pentylammonium bis(trifluoromethanesulfonyl) imide, N,N-dipropyl-N-butyl-N-hexylammonium bis(trifluoromethanesulfonyl)imide, N,N-dipropyl-N,N-dihexylammonium bis(trifluoromethanesulfonyl)imide, N,N-dibutyl-N-methyl-N-pentylammonium bis(trifluoromethanesulfonyl)imide, N,N-dibutyl-N-methyl-N-hexylammonium bis(trifluoromethanesulfonyl)imide, trioctylmethylammonium bis(trifluoromethanesulfonyl)imide, N-methyl-N-ethyl-N-propyl-N-pentylammonium bis(trifluoromethanesulfonyl)imide, and 1-butyl-3-methylpyridine-1-ium trifluoromethanesulfonate. Commercially available products of the above may be used, examples of which include CIL-314 manufactured by Japan Carlit Co., Ltd. and ILA2-1 manufactured by KOEI CHEMICAL COMPANY LIMITED.

Examples thereof also include tetramethylammonium bis(trifluoromethanesulfonyl)imide, trimethylethylammonium bis(trifluoromethanesulfonyl)imide, trimethylbutylammonium bis(trifluoromethanesulfonyl)imide, trimethylpentylammonium bis(trifluoromethanesulfonyl)imide, trimethylheptylammonium bis(trifluoromethanesulfonyl)imide, trimethyloctylammonium bis(trifluoromethanesulfonyl)imide, tetraethylammonium bis(trifluoromethanesulfonyl)imide, triethylbutylammonium bis(trifluoromethanesulfonyl) imide, tetrabutylammonium bis(trifluoromethanesulfonyl) imide, and tetrahexylammonium bis(trifluoromethanesulfonyl)imide.

Examples thereof further include 1-dimethylpyrrolidinium bis(trifluoromethanesulfonyl)imide, 1-methyl-1-ethylpyrrolidinium bis(trifluoromethanesulfonyl)imide, 1-methyl-1-propylpyrrolidinium bis(trifluoromethanesulfonyl)imide, 1-methyl-1-butylpyrrolidinium bis(trifluoromethanesulfonyl)imide, 1-methyl-1-pentylpyrrolidinium bis(trifluoromethanesulfonyl)imide, 1-methyl-1-hexylpyrrolidinium bis(trifluoromethanesulfonyl)imide, 1-methyl-1-heptylpyrrolidinium bis(trifluoromethanesulfonyl)imide, 1-ethyl-1-propylpyrrolidinium bis(trifluoromethanesulfonyl)imide, 1-ethyl-1-butylpyrrolidinium bis(trifluoromethanesulfonyl)imide, 1-ethyl-1-pentylpyrrolidinium bis(trifluoromethanesulfonyl)imide, 1-ethyl-1-hexylpyrrolidinium bis(trifluoromethanesulfonyl)imide, 1-ethyl-1-heptylpyrrolidinium bis(trifluoromethanesulfonyl)imide, 1,1-dipropylpyrrolidinium bis(trifluoromethanesulfonyl)imide, 1-propyl-1-butylpyrrolidinium bis(trifluoromethanesulfonyl) imide, 1,1-dibutylpyrrolidinium bis(trifluoromethanesulfonyl)imide, 1-propylpiperidinium bis(trifluoromethanesulfonyl)imide, 1-pentylpiperidinium bis(trifluoromethanesulfonyl)imide, 1,1-dimethylpiperidinium bis(trifluoromethanesulfonyl)imide, 1-methyl-1-ethylpiperidinium bis(trifluoromethanesulfonyl)imide, 1-methyl-1-propylpiperidinium bis(trifluoromethanesulfonyl)imide, 1-methyl-1-butylpiperidinium bis(trifluoromethanesulfonyl)imide, 1-methyl-1-pentylpiperidinium bis(trifluoromethanesulfonyl)imide, 1-methyl-1-hexylpiperidinium bis(trifluoromethanesulfonyl)imide, 1-methyl-1-heptylpiperidinium bis(trifluoromethanesulfonyl)imide, 1-ethyl-1-propylpiperidinium bis(trifluoromethanesulfonyl)imide, 1-ethyl-1-butylpiperidinium bis(trifluoromethanesulfonyl) imide, 1-ethyl-1-pentylpiperidinium bis(trifluoromethanesulfonyl)imide, 1-ethyl-1-hexylpiperidinium bis(trifluoromethanesulfonyl)imide, 1-ethyl-1-heptylpiperidinium bis(trifluoromethanesulfonyl)imide, 1,1-dipropylpiperidinium bis(trifluoromethanesulfonyl)imide, 1-propyl-1-butylpiperidinium bis(trifluoromethanesulfonyl)imide, 1,1-dibutylpiperidinium bis(trifluoromethanesulfonyl)imide, 1,1-dimethylpyrrolidinium bis(pentafluoroethanesulfonyl)imide, 1-methyl-1-ethylpyrrolidinium bis(pentafluoroethanesulfonyl)imide, 1-methyl-1-propylpyrrolidiniumbis(pentafluoroethanesulfonyl)imide, 1-methyl-1-butylpyrrolidiniumbis(pentafluoroethanesulfonyl)imide, 1-methyl-1-pentylpyrrolidiniumbis(pentafluoroethanesulfonyl)imide, 1-methyl-1-hexylpyrrolidiniumbis(pentafluoroethanesulfonyl)imide, 1-methyl-1-heptylpyrrolidiniumbis(pentafluoroethanesulfonyl)imide, 1-ethyl-1-propylpyrrolidiniumbis(pentafluoroethanesulfonyl)imide, 1-ethyl-1-butylpyrrolidinium bis(pentafluoroethanesulfonyl)imide, 1-ethyl-1-pentylpyrrolidiniumbis(pentafluoroethanesulfonyl)imide, 1-ethyl-1-hexylpyrrolidinium bis(pentafluoroethanesulfonyl)imide, 1-ethyl-1-heptylpyrrolidiniumbis(pentafluoroethanesulfonyl)imide, 1,1-dipropylpyrrolidinium bis(pentafluoroethanesulfonyl)imide, 1-propyl-1-butylpyrrolidiniumbis(pentafluoroethanesulfonyl)imide, 1,1-dibutylpyrrolidinium bis(pentafluoroethanesulfonyl)imide, 1-propylpiperidinium bis(pentafluoroethanesulfonyl)imide, 1-pentylpiperidinium bis(pentafluoroethanesulfonyl)imide, 1,1-dimethylpiperidinium bis(pentafluoroethanesulfonyl)imide, 1-methyl-1-ethylpiperidinium bis(pentafluoroethanesulfonyl)imide, 1-methyl-1-propylpiperidiniumbis(pentafluoroethanesulfonyl)imide, 1-methyl-1-butylpiperidinium bis(pentafluoroethanesulfonyl)imide, 1-methyl-1-pentylpiperidiniumbis(pentafluoroethanesulfonyl)imide, 1-methyl-1-hexylpiperidinium bis(pentafluoroethanesulfonyl)imide, 1-methyl-1-heptylpiperidiniumbis(pentafluoroethanesulfonyl)imide, 1-ethyl-1-propylpiperidinium bis(pentafluoroethanesulfonyl)imide, 1-ethyl-1-heptylpiperidinium bis(pentafluoroethanesulfonyl)imide, 1-ethyl-1-pentylpiperidinium bis(pentafluoroethanesulfonyl)imide, 1-ethyl-1-hexylpiperidinium bis(pentafluoroethanesulfonyl)imide, 1-ethyl-1-heptylpiperidinium bis(pentafluoroethanesulfonyl)imide, 1-propyl-1-butylpiperidinium bis(pentafluoroethanesulfonyl) imide, 1,1-dipropylpiperidinium bis(pentafluoroethanesulfonyl)imide, and 1,1-dibutylpiperidinium bis(pentafluoroethanesulfonyl)imide.

Examples thereof further include derivatives of the above compounds, in which the cation moiety is replaced by trimethylsulfonium cation, triethylsulfonium cation, tributylsulfonium cation, trihexylsulfonium cation, diethylmethylsulfonium cation, dibutylethylsulfonium cation, dimethyldecylsulfonium cation, tetramethylphosphonium cation, tetraethylphosphonium cation, tetrabutylphosphonium cation, or tetrahexylphosphonium cation.

Examples thereof further include derivatives of the above compounds, in which bis(trifluoromethanesulfonyl)imide is replaced by bis(pentafluorosulfonyl)imide, bis(heptafluoropropanesulfonyl)imide, bis(nonafluorobutanesulfonyl) imide, tri fluoromethanesulfonylnonafluorobutanesulfonylimide, heptafluoropropanesulfonyltrifluoromethanesulfonylimide, pentafluoroethanesulfonylnonafluorobutanesulfonylimide, or cyclo-hexafluoropropane-1,3-bis(sulfonyl)imide anion.

Besides the alkali metal salts and the organic cation-anion salts, examples of the ionic compound (C) further include inorganic salts such as ammonium chloride, aluminum chloride, copper chloride, ferrous chloride, ferric chloride, and ammonium sulfate. These ionic compounds (C) may be used alone or in combination of two or more.

The content of the ionic compound (C) in the pressure-sensitive adhesive for optical applications of the present invention is preferably 5 parts or less by weight, further preferably from 0.0001 to 5 parts by weight based on 100 parts by weight of the base polymer (A). If the content of the ionic compound (C) is less than 0.0001 parts by weight, the effect of improving antistatic performance may be insufficient. The content of the ionic compound (C) is preferably 0.01 parts by weight or more, more preferably 0.1 parts by weight or more. On the other hand, if the content of the ionic compound (C) is more than 5 parts by weight, durability may be insufficient. The content of the ionic compound (C) is preferably 3 parts by weight or less, more preferably 1 part by weight or less. The content of the compound (C) can be set in a preferred range, taking into account the above upper and lower limits.

In the present invention, the pressure-sensitive adhesive for optical applications may contain an antioxidant (D). The antioxidant (D) is preferred to improve the durability of the pressure-sensitive adhesive layer. Examples of the antioxidant (D) include a phenolic antioxidant, a phosphorus antioxidant, a sulfur antioxidant, and an amine antioxidant, and at least one selected from these antioxidants may be used. In particular, a phenolic antioxidant is preferred.

Examples of the phenolic antioxidant include monocyclic phenol compounds such as 2,6-di-tert-butyl-p-cresol, 2,6-di-tert-butyl-4-ethylphenol, 2,6-dicyclohexyl-4-methylphenol, 2,6-diisopropyl-4-ethylphenol, 2,6-di-tert-amyl-4-methylphenol, 2,6-di-tert-octyl-4-n-propylphenol, 2,6-dicyclohexyl-4-n-octylphenol, 2-isopropyl-4-methyl-6-tert-butylphenol, 2-tert-butyl-4-ethyl-6-tert-octylphenol, 2-isobutyl-4-ethyl-6-tert-hexylphenol, 2-cyclohexyl-4-n-butyl-6-isopropylphenol, a mixed cresol modified with styrene, DL-α-tocopherol, and stearyl β-(3,5-di-tert-butyl-4-hydroxyphenyl)propionate; bicyclic phenol compounds such as 2,2'-methylenebis(4-methyl-6-tert-butylphenol), 4,4'-butylidenebis(3-methyl-6-tert-butylphenol), 4,4'-thiobis(3-methyl-6-tert-butylphenol), 2,2'-thiobis(4-methyl-6-tert-butylphenol), 4,4'-methylenebis(2,6-di-tert-butylphenol), 2,2'-methylenebis[6-(1-methylcyclohexyl)-p-cresol], 2,2'-ethylidenebis(4,6-di-tert-butylphenol), 2,2'-butylidenebis(2-tert-butyl-4-methylphenol), 3,6-dioxaoctamethylenebis[3-(3-tert-butyl-4-hydroxy-5-methylphenyl)propionate], triethyleneglycol bis[3-(3-tert-butyl-5-methyl-4-hydroxyphenyl)propionate], 1,6-hexanediol bis[3-(3,5-di-tert-butyl-4-hydroxyphenyl)propionate], and 2,2'-thiodiethylenebis[3-(3,5-di-tert-butyl-4-hydroxyphenyl)propionate]; tricyclic phenol compounds such as 1,1,3-tris(2-methyl-4-hydroxy-5-tert-butylphenyl)butane, 1,3,5-tris(2,6-dimethyl-3-hydroxy-4-tert-butylbenzyl)isocyanurate, 1,3,5-tris[(3,5-di-tert-butyl-4-hydroxyphenyl)propionyloxyethyl] isocyanurate, tris(4-tert-butyl-2,6-dimethyl-3-hydroxybenzyl)isocyanurate, and 1,3,5-trimethyl-2,4,6-tris (3,5-di-tert-butyl-4-hydroxybenzyl)benz ene; tetracyclic phenol compounds such as tetrakis[methylene-3-(3,5-di-tert-butyl-4-hydroxyphenyl)propionate]methane; and phosphorus-containing phenol compounds such as potassium bis(ethyl 3,5-di-tert-butyl-4-hydroxybenzylphosphonate) and nickel bis(ethyl 3,5-di-tert-butyl-4-hydroxybenzylphosphonate).

Examples of the phosphorus antioxidant include trioctyl phosphite, trilauryl phosphite, tristridecyl phosphite, trisisodecyl phosphite, phenyl diisooctyl phosphite, phenyl diisodecyl phosphite, phenyl di(tridecyl)phosphite, diphenyl isooctyl phosphite, diphenyl isodecyl phosphite, diphenyl tridecyl phosphite, triphenyl phosphite, tris(nonylphenyl) phosphite, tris(2,4-di-tert-butylphenyl)phosphite, tris(butoxyethyl)phosphite, tetratridecyl-4,4'-butylidenebis(3-methyl-6-tert-butylphenol)diphosphite, 4,4'-isopropylidenediphenol alkyl phosphite (wherein the alkyl group has about 12 to about 15 carbon atoms), 4,4'-isopropylidenebis(2-tert-butylphenol)di(nonylphenyl)phosphite, tris(biphenyl)phosphite, tetra(tridecyl)-1,1,3-tris(2-methyl-5-tert-butyl-4-hydroxyphenyl) butane diphosphite, tris(3,5-di-tert-butyl-4-hydroxyphenyl)phosphite, hydrogenated 4,4'-isopropylidenediphenol polyphosphite, bis(octylphenyl)bis [4,4'-butylidenebis(3-methyl-6-tert-butylphenol)]1,6-hexanediol diphosphite, hexatridecyl-1,1,3-tris(2-methyl-4-hydroxy-5-tert-butylphenol)diphosphite, tris[4,4'-isopropylidenebis(2-tert-butylphenol)]phosphite, tris(1,3-distearoyloxyisopropyl)phosphite, 9,10-dihydro-9-phosphaphenanthrene-10-oxide, tetrakis(2,4-di-tert-butylphenyl)-4,4'-biphenylene diphosphonite, distearyl pentaerythritol diphosphite, di(nonylphenyl)pentaerythritol diphosphite, phenyl 4,4,'-isopropylidenediphenol pentaerythritol diphosphite, bis(2,4-di-tert-butylphenyl)pentaerythritol diphosphite, bis(2,6-di-tert-butyl-4-methylphenyl)pentaerythritol diphosphite, and phenylbisphenol-A-pentaerythritol diphosphite.

Dialkyl thiodipropionates and polyhydric alcohol esters of alkylthiopropionic acid are preferably used as sulfur antioxidants. Dialkyl thiodipropionates having an alkyl group of 6 to 20 carbon atoms are preferably used in the present invention. Polyhydric alcohol esters of alkylthiopropionic acid preferably have an alkyl group of 4 to 20 carbon atoms. In this case, examples of the polyhydric alcohol for forming the polyhydric alcohol esters include glycerol, trimethylolethane, trimethylolpropane, pentaerythritol, and trishydroxyethyl isocyanurate. Examples of such dialkyl thiodipropionates include dilauryl thiodipropionate, dimyristyl thiodipropionate and distearyl thiodipropionate. Examples of polyhydric alcohol esters of alkylthiopropionic acid include glycerol tributylthiopropionate, glycerol trioctylthiopropionate, glycerol trilaurylthiopropionate, glycerol tristearylthiopropionate, trimethylolethane tributylthiopropionate, trimethylolethane trioctylthiopropionate, trimethylolethane trilaurylthiopropionate, trimethylolethane tristearylthiopropionate, pentaerythritol tetrabutylthiopropionate, pentaerythritoltetraoctylthiopropionate, pentaerythritol tetralaurylthiopropionate, and pentaerythritol tetrastearylthiopropionate.

Examples of the amine antioxidant include bis(2,2,6,6-tetramethyl-4-piperidyl)sebacate, polycondensates of dimethyl succinate and 1-(2-hydroxyethyl)-4-hydroxy-2,2,6,6-tetramethylpiperidineethanol, N,N',N'',N'''-tetrakis(4,6-bis (butyl-(N-methyl-2,2,6,6-tetramethylpiperidine-4-yl) amino)-triazine-2-yl)-4,7-diazadecane-1,10-diamine, polycondensates of dibutylamine-1,3,5-triazine-N,N'-bis(2, 2,6,6-tetramethyl-4-piperdyl)-1,6-hexamethylenediamine and N-(2,2,6,6-tetramethyl-4-piperidyl)butylamine, poly [{6-1,1,3,3-tetramethylbutyl)amino-1,3,5-triazine-2,4-diyl}{(2,2,6,6-tetramethyl-4-piperidyl) imino}hexamethylene{(2,2,6,6-tetramethyl-4-piperidyl) imino}], tetrakis(2,2,6,6-tetramethyl-4-piperidyl)-1,2,3,4-butanetetracarboxylate, 2,2,6,6-tetramethyl-4-piperidyl benzoate, bis(1,2,6,6-pentamethyl-4-piperidyl)-2-(3,5-di-tert-butyl-4-hydroxybenzyl)-2-n-butyl malonate, bis(N-methyl-2,2,6,6-tetramethyl-4-piperidyl)sebacate, 1,1'-(1,2-ethanediyl)-bis(3,3,5,5-tetramethylpiperadinone), (mixed 2,2,6,6-tetramethyl-4-piperidyl/tridecyl)-1,2,3,4-butanetetracarboxylate, (mixed 1,2,2,6,6-pentamethyl-4-piperidyl/tridecyl)-1,2,3,4-butanetetracarboxylate, mixed [2,2,6,6-tetramethyl-4-piperidyl/8,8,8',8'-tetramethyl-3,9-[2,4,8,10-tetraoxaspiro(5,5)undecane]diethyl]-1,2,3,4-butanetetracarboxylate, mixed [1,2,2,6,6-pentamethyl-4-piperidyl/8,8,8',8'-tetramethyl-3,9-[2,4,8,10-tetraoxaspiro (5,5)undecane]diethyl]-1,2,3,4-butanetetracarboxylate, condensates of N,N'-bis(3-aminopropyl)ethylenediamine-2, 4-bis[N-butyl-N-(1,2,2,6,6-pentamethyl-4-piperidyl) amino]-6-chloro-1,3,5-triazine, poly[6-N-morpholyl-1,3,5-triazine-2,4-diyl][(2,2,6,6-tetramethyl-4-piperidyl)imino] hexamethylene[(2,2,6,6-tetramethyl-4-piperidyl)imide], condensates of N,N'-bis(2,2,6,6-tetramethyl-4-piperidyl) hexamethylenediamine and 1,2-dibromoethane, and [N-(2,2,6,6-tetramethyl-4-piperidyl)-2-methyl-2-(2,2,6,6-tetramethyl-4-piperidyl)imino]propionamide.

In the present invention, the content of the antioxidant (D) in the pressure-sensitive adhesive for optical applications is preferably 5 parts by weight or less, more preferably from 0.01 to 2 parts by weight, based on 100 parts by weight of the base polymer (A). The content of the antioxidant (D) is preferably 0.05 parts by weight or more, more preferably 0.1 parts by weight or more. On the other hand, an antioxidant (D) content of more than 5 parts by weight may cause a reduction in durability or a reduction in degree of crosslinking. The content of the antioxidant (D) is preferably 1.5 parts by weight or less, more preferably 1 part by weight or less. The preferred range of the antioxidant (D) content may be defined based on the above upper and lower limit values.

The pressure-sensitive adhesive for optical applications of the present invention further includes a crosslinking agent (E). An organic crosslinking agent or a polyfunctional metal chelate may also be used as the crosslinking agent (E). Examples of the organic crosslinking agent include an isocyanate crosslinking agent, an epoxy crosslinking agents, a peroxide crosslinking agents and an imine crosslinking agents. The polyfunctional metal chelate may include a polyvalent metal and an organic compound that is covalently or coordinately bonded to the metal. Examples of the polyvalent metal atom include Al, Cr, Zr, Co, Cu, Fe, Ni, V, Zn, In, Ca, Mg, Mn, Y, Ce, Sr, Ba, Mo, La, Sn, and Ti. The organic compound has a covalent or coordinate bond-forming atom such as an oxygen atom. Examples of the organic compound include alkyl esters, alcohol compounds, carboxylic acid compounds, ether compounds, and ketone compounds.

The crosslinking agent (E) to be used is preferably selected from an isocyanate crosslinking agent and/or a peroxide crosslinking agent. Examples of such a compound for the isocyanate crosslinking agent include isocyanate monomers such as tolylene diisocyanate, chlorophenylene diisocyanate, tetramethylene diisocyanate, xylylene diisocyanate, diphenylmethane diisocyanate, and hydrogenated diphenylmethane diisocyanate, and isocyanate compounds produced by adding any of these isocyanate monomers to trimethylolpropane or the like; and urethane prepolymer type isocyanates produced by the addition reaction of isocyanurate compounds, burette type compounds, or polyether polyols, polyester polyols, acrylic polyols, polybutadiene polyols, polyisoprene polyols, or the like. Particularly preferred is a polyisocyanate compound such as one selected from the group consisting of hexamethylene diisocyanate, hydrogenated xylylene diisocyanate, and isophorone diisocyanate, or a derivative thereof. Examples of one selected from the group consisting of hexamethylene diisocyanate, hydrogenated xylylene diisocyanate, and isophorone diisocyanate, or a derivative thereof include hexamethylene diisocyanate, hydrogenated xylylene diisocyanate, isophorone diisocyanate, polyol-modified hexamethylene diisocyanate, polyol-modified hydrogenated xylylene diisocyanate, trimer-type hydrogenated xylylene diisocyanate, and polyol-modified isophorone diisocyanate. The listed polyisocyanate compounds are preferred, because their reaction with a hydroxyl group quickly proceeds as if an acid or a base contained in the polymer acts as a catalyst, which particularly contributes to the rapidness of the crosslinking.

Any peroxide capable of generating active radical species by heating or photoirradiation and promoting the crosslinking of the base polymer in the pressure-sensitive adhesive composition may be appropriately used. In view of workability and stability, a peroxide with a one-minute half-life temperature of 80° C. to 160° C. is preferably used, and a peroxide with a one-minute half-life temperature of 90° C. to 140° C. is more preferably used.

Examples of the peroxide for use in the present invention include di(2-ethylhexyl) peroxydicarbonate (one-minute half-life temperature: 90.6° C.), di(4-tert-butylcyclohexyl) peroxydicarbonate (one-minute half-life temperature: 92.1° C.), di-sec-butyl peroxydicarbonate (one-minute half-life temperature: 92.4° C.), tert-butyl peroxyneodecanoate (one-minute half-life temperature: 103.5° C.), tert-hexyl peroxypivalate (one-minute half-life temperature: 109.1° C.), tert-butyl peroxypivalate (one-minute half-life temperature: 110.3° C.), dilauroyl peroxide (one-minute half-life temperature: 116.4° C.), di-n-octanoylperoxide (one-minute half-life temperature: 117.4° C.), 1,1,3,3-tetramethylbutylperoxy-2-ethyl hexanoate (one-minute half-life temperature: 124.3° C.), di(4-methylbenzoyl) peroxide (one-minute half-life temperature: 128.2° C.), dibenzoyl peroxide (one-minute half-life temperature: 130.0° C.), tert-butyl peroxyisobutylate (one-minute half-life temperature: 136.1° C.), and 1,1-di(tert-hexylperoxy)cyclohexane (one-minute half-life temperature: 149.2° C.). In particular, di(4-tert-butylcyclohexyl) peroxydicarbonate (one-minute half-life temperature: 92.1° C.), dilauroyl peroxide (one-minute half-life temperature: 116.4° C.), dibenzoyl peroxide (one-minute half-life temperature: 130.0° C.), or the like is preferably used, because they can provide high crosslinking reaction efficiency.

The half life of the peroxide is an indicator of how fast the peroxide can be decomposed and refers to the time required for the amount of the peroxide to reach one half of its original value. The decomposition temperature required for a certain half life and the half life time obtained at a certain temperature are shown in catalogs furnished by manufacturers, such as "Organic Peroxide Catalog, 9th Edition, May, 2003" furnished by NOF CORPORATION.

The amount of the crosslinking agent (E) to be used is preferably from 0.01 to 20 parts by weight, more preferably from 0.03 to 10 parts by weight, based on 100 parts by weight of the (meth)acryl-based polymer. If the amount of the crosslinking agent (E) is less than 0.01 parts by weight, the cohesive strength of the pressure-sensitive adhesive may tend to be insufficient, and foaming may occur during heating. If the amount of the crosslinking agent (E) is more than 20 parts by weight, the humidity resistance may be insufficient, so that peeling may easily occur in a reliability test or the like.

One of the isocyanate crosslinking agents may be used alone, or a mixture of two or more of the isocyanate crosslinking agents may be used. The total content of the polyisocyanate compound crosslinking agent (s) is preferably from 0.01 to 2 parts by weight, more preferably from 0.02 to 2 parts by weight, even more preferably from 0.05 to 1.5 parts by weight, based on 100 parts by weight of the (meth)acryl-based polymer. The content may be appropriately controlled taking into account the cohesive strength or the prevention of peeling in a durability test or the like.

One of the peroxide crosslinking agents may be used alone, or a mixture of two or more of the peroxide crosslinking agent may be used. The total content of the peroxide(s) is preferably from 0.01 to 2 parts by weight, more preferably from 0.04 to 1.5 parts by weight, even more preferably from 0.05 to 1 part by weight, based on 100 parts by weight of the (meth)acryl-based polymer. The content of the peroxide(s) may be appropriately selected in this range in order to control the workability, reworkability, crosslink stability or peeling properties.

The amount of decomposition of the peroxide may be determined by measuring the peroxide residue after the reaction process by high performance liquid chromatography (HPLC).

More specifically, for example, after the reaction process, about 0.2 g of each pressure-sensitive adhesive composition is taken out, immersed in 10 ml of ethyl acetate, subjected to shaking extraction at 25° C. and 120 rpm for 3 hours in a shaker, and then allowed to stand at room temperature for 3 days. Thereafter, 10 ml of acetonitrile is added, and the mixture is shaken at 25° C. and 120 rpm for 30 minutes. About 10 µl of the liquid extract obtained by filtration through a membrane filter (0.45 µm) is subjected to HPLC by injection and analyzed so that the amount of the peroxide after the reaction process is determined.

The pressure-sensitive adhesive for optical applications of the present invention may further contain a silane coupling agent (F). The durability or the reworkability can be improved using the silane coupling agent (F). Examples of silane coupling agent include epoxy group-containing silane coupling agents such as 3-glycidoxypropyltrimethoxysilane, 3-glycidoxypropyltriethoxysilane, 3-glycidoxypropylmethyldiethoxysilane, and 2-(3,4-epoxycyclohexyl)ethyltrimethoxysilane; amino group-containing silane coupling agents such as 3-aminopropyltrimethoxysilane, N-(2-aminoethyl)-3-aminopropylmethyldimethoxysilane, and 3-triethoxysilyl-N-(1,3-dimethylbutylidene)propylamine; (meth)acrylic group-containing silane coupling agents such as 3-acryloxypropyltrimethoxysilane and 3-methacryloxypropyltriethoxysilane; and isocyanate group-containing silane coupling agents such as 3-isocyanatepropyltriethoxysilane.

One of the silane coupling agents (F) may be used alone, or a mixture of two or more of the silane coupling agents. The total content of the silane coupling agent(s) is preferably from 0.001 to 5 parts by weight, more preferably from 0.01 to 1 part by weight, even more preferably from 0.02 to 1 part by weight, still more preferably from 0.05 to 0.6 parts by weight, based on 100 parts by weight of the (meth)acryl-based polymer. The content of the silane coupling agent may be appropriately amount in order to control improve durability and maintain adhesive strength to the optical member such as a liquid crystal cell.

The pressure-sensitive adhesive for optical applications of the present invention may also contain any other known additive. For example, a powder such as a colorant and a pigment, a tackifier, a dye, a surfactant, a plasticizer, a surface lubricant, a leveling agent, a softening agent, an antioxidant, an age resister, alight stabilizer, an ultraviolet absorbing agent, a polymerization inhibitor, an inorganic or organic filler, a metal powder, or a particle- or foil-shaped material may be added as appropriate depending on the intended use. A redox system including an added reducing agent may also be used in the controllable range.

A pressure-sensitive adhesive layer for optical applications is form of the pressure-sensitive adhesive for optical applications. To form the pressure-sensitive adhesive layer, it is preferred that the total amount of the addition of the crosslinking agent should be controlled and that the effect of the crosslinking temperature and the crosslinking time should be carefully taken into account.

The crosslinking temperature and the crosslinking time may be controlled depending on the crosslinking agent used. The crosslinking temperature is preferably 170° C. or less.

The crosslinking process may be performed at the temperature of the process of drying the pressure-sensitive adhesive layer, or the crosslinking process may be separately performed after the drying process.

The crosslinking time is generally from about 0.2 to about 20 minutes, preferably from about 0.5 to about 10 minutes, while it may be set taking into account productivity and workability.

In an embodiment of the present invention, the pressure-sensitive adhesive layer-attached optical film includes an optical film and a pressure-sensitive adhesive layer for optical applications that is formed on at least one side of the optical film and produced with the pressure-sensitive adhesive for optical applications.

For example, the pressure-sensitive adhesive layer may be formed by a method including applying the pressure-sensitive adhesive for optical applications to a release-treated separator or the like, removing the polymerization solvent and so on by drying to form a pressure-sensitive adhesive layer and then transferring it to an optical film, or by a method including applying the pressure-sensitive adhesive for optical applications to an optical film and removing the polymerization solvent and so on by drying to form a pressure-sensitive adhesive layer on the optical film. Before the pressure-sensitive adhesive is applied, in addition at least one solvent other than the polymerization solvent may be added to the pressure-sensitive adhesive.

A silicone release liner is preferably used as the release-treated separator. The pressure-sensitive adhesive composition of the present invention may be applied to such a liner and dried to form a pressure-sensitive adhesive layer. In this process, the pressure-sensitive adhesive may be dried using any appropriate method depending on the purpose. A method of drying by heating the coating film is preferably used. The heat drying temperature is preferably from 40° C. to 200° C., more preferably from 50° C. to 180° C., particularly preferably from 70° C. to 170° C. When the heating temperature is set in the above range, a pressure-sensitive adhesive having good adhesive properties can be obtained.

Any appropriate drying time may be used. The drying time is preferably from 5 seconds to 20 minutes, more preferably from 5 seconds to 10 minutes, particularly preferably from 10 seconds to 5 minutes.

An anchor layer may also be formed on the surface of the optical film or the surface of the optical film may be subjected to any of various adhesion-facilitating treatments such as a corona treatment and a plasma treatment, and then forming the pressure-sensitive adhesive layer. The surface of the pressure-sensitive adhesive layer may also be subjected to an adhesion-facilitating treatment.

Various methods may be used to form the pressure-sensitive adhesive layer. Specific examples of such methods include roll coating, kiss roll coating, gravure coating, reverse coating, roll brush coating, spray coating, dip roll coating, bar coating, knife coating, air knife coating, curtain coating, lip coating, and extrusion coating with a die coater or the like.

The thickness of the pressure-sensitive adhesive layer is typically, but not limited to, from about 1 to 100 µm, preferably from 2 to 50 µm, more preferably from 2 to 40 µm, further preferably from 5 to 35 µm.

When the pressure-sensitive adhesive layer is exposed, the pressure-sensitive adhesive layer may be protected with a sheet having undergone release treatment (a separator) before practical use.

Examples of the material for forming the separator include a plastic film such as a polyethylene, polypropylene, polyethylene terephthalate, or polyester film, a porous material such as paper, cloth and nonwoven fabric, and an appropriate thin material such as a net, a foamed sheet, a metal foil, and a laminate thereof. In particular, a plastic film is preferably used, because of its good surface smoothness.

The plastic film may be any film capable of protecting the pressure-sensitive adhesive layer, and examples thereof include a polyethylene film, a polypropylene film, a polybutene film, a polybutadiene film, a polymethylpentene film, a polyvinyl chloride film, a vinyl chloride copolymer film, a polyethylene terephthalate film, a polybutylene terephthalate film, a polyurethane film, and an ethylene-vinyl acetate copolymer film.

The thickness of the separator is generally from about 5 to about 200 µm, preferably from about 5 to about 100 µm. If necessary, the separator may be treated with a release agent such as a silicone, fluorine, long-chain alkyl, or fatty acid amide release agent, or may be subjected to release and antifouling treatment with silica powder or to antistatic treatment of coating type, kneading and mixing type, vapor-deposition type, or the like. In particular, if the surface of the separator is appropriately subjected to release treatment such as silicone treatment, long-chain alkyl treatment, and fluorine treatment, the releasability from the pressure-sensitive adhesive layer can be further increased.

In the above production method, the release-treated sheet may be used without modification as a separator for the pressure-sensitive adhesive sheet, the pressure-sensitive adhesive layer-attached optical film or the like, so that the process can be simplified.

The optical film may be of any type for use in forming image displays such as liquid crystal displays. For example, a polarizing film is exemplified as the optical film. A polarizing film including a polarizer and a transparent protective film provided on one or both sides of the polarizer is generally used. The pressure-sensitive adhesive of the present invention for optical applications is effectively used on a polarizing film including a polarizer and a transparent protective film provided only on one side of the polarizer. In this case, the pressure-sensitive adhesive layer is provided directly on the side of the polarizer opposite to its side on which the transparent protective film is provided.

A thin polarizer with a thickness of 10 µm or less may also be used. In view of thinning, the thickness is preferably from 1 to 7 µm. Such a thin polarizer is less uneven in thickness, has good visibility, and is less dimensionally-variable and therefore has high durability. It is also preferred because it can form a thinner polarizing film.

A polarizer is not limited especially but various kinds of polarizer may be used. As a polarizer, for example, a film that is uniaxially stretched after having dichromatic substances, such as iodine and dichromatic dye, absorbed to hydrophilic high molecular weight polymer films, such as polyvinyl alcohol-based film, partially formalized polyvinyl alcohol-based film, and ethylene-vinyl acetate copolymer-based partially saponified film; poly-ene-based alignment films, such as dehydrated polyvinyl alcohol and dehydrochlorinated polyvinyl chloride, etc. may be mentioned. In these, a polyvinyl alcohol-based film on which dichromatic materials such as iodine, is absorbed and aligned after stretched is suitably used.

A iodine-based polarizer that is uniaxially stretched after a polyvinyl alcohol-based film dyed with iodine is obtained by stretching a polyvinyl alcohol-based film by 3 to 7 times the original length, after dipped and dyed in aqueous solution of iodine. If needed the film may also be dipped in aqueous solutions, such as boric acid and potassium iodide, which may include zinc sulfate, zinc chloride. Furthermore, before dyeing, the polyvinyl alcohol-based film may be dipped in water and rinsed if needed. By rinsing polyvinyl alcohol-based film with water, effect of preventing un-uniformity, such as unevenness of dyeing, is expected by making polyvinyl alcohol-based film swelled in addition that also soils and blocking inhibitors on the polyvinyl alcohol-based film surface may be washed off. Stretching may be applied after dyed with iodine or may be applied concurrently, or conversely dyeing with iodine may be applied after stretching. Stretching is applicable in aqueous solutions, such as boric acid and potassium iodide, and in water bath.

Typical examples of such a thin polarizer include the thin polarizing layers disclosed in JP-ANo. 51-069644, JP-ANo. 2000-338329, WO2010/100917, specification of PCT/JP2010/001460, specification of Japanese Patent Application No. 2010-269002, or specification of Japanese Patent Application No. 2010-263692. These thin polarizing layers can be obtained by a process including the steps of stretching a laminate of a polyvinyl alcohol-based resin (hereinafter also referred to as PVA-based resin) layer and a stretchable resin substrate and dyeing the laminate. Using this process, the PVA-based resin layer, even when thin, can be stretched without problems such as breakage, which would otherwise be caused by stretching of the layer supported on a stretchable resin substrate.

Among processes including the steps of stretching and dyeing a laminate, a process capable of high-ratio stretching to improve polarizing performance is preferably used to obtain the thin polarizing layer. Therefore, the thin polarizing layer is preferably obtained by a process including the step of stretching in an aqueous boric acid solution as disclosed in WO2010/100917, the specification of PCT/JP2010/001460, the specification of Japanese Patent Application No. 2010-269002, or the specification of Japanese Patent Application No. 2010-263692, in particular, preferably obtained by a process including the step of performing auxiliary in-air stretching before stretching in an aqueous boric acid solution as disclosed in the specification of Japanese Patent Application No. 2010-269002 Or the specification of Japanese Patent Application or 2010-263692.

The iodine-based polarizer preferably has a high iodine content (high iodine and/or iodide ion content), which is adjusted to 3 to 10% by weight. The iodine-based polarizer with high iodine content is advantageously used to form a thin polarizer. The iodine-based polarizer with high iodine content is advantageous in that after a pressure-sensitive adhesive layer is bonded to the polarizer, iodine and/or iodide ions can be easily transferred from the polarizer to the pressure-sensitive adhesive layer.

A thermoplastic resin with a high level of transparency, mechanical strength, thermal stability, moisture blocking properties, isotropy, and the like may be used as a material for forming the transparent protective film. Examples of such a thermoplastic resin include cellulose resins such as triacetylcellulose, polyester resins, polyethersulfone resins, polysulfone resins, polycarbonate resins, polyamide resins, polyimide resins, polyolefin resins, (meth)acrylic resins, cyclic olefin polymer resins (norbornene resins), polyarylate resins, polystyrene resins, polyvinyl alcohol resins, and any mixture thereof. The transparent protective film may also contain at least one type of any appropriate additive. Examples of the additive include an ultraviolet absorbing agent, an antioxidant, a lubricant, a plasticizer, a release agent, an anti-discoloration agent, a flame retardant, a nucleating agent, an antistatic agent, a pigment, and a colorant. The content of the thermoplastic resin in the transparent protective film is preferably from 50 to 100% by weight, more preferably from 50 to 99% by weight, still more preferably from 60 to 98% by weight, particularly preferably from 70 to 97% by weight. If the content of the thermoplastic resin in the transparent protective film is 50% by weight or less, high transparency and other properties inherent in the thermoplastic resin can fail to be sufficiently exhibited.

The polarizer may be bonded to the transparent protective film with an adhesive. Examples of such an adhesive include isocyanate adhesives, polyvinyl alcohol adhesives, gelatin adhesives, vinyl latexes, and aqueous polyesters. The adhesive is generally used in the form of an aqueous solution, which generally has a solids content of 0.5 to 60% by weight. Besides the above, an active energy ray-curable adhesive such as an ultraviolet-curable adhesive or an electron beam-curable adhesive may also be used as the adhesive to bond the polarizer to the transparent protective film. Electron beam-curable adhesives for polarizing films exhibit good adhesion to the transparent protective film. In the adhesive used in the present invention may contain a metal compound filler.

Further an optical film of the present invention may be used as other optical layers, such as a reflective plate, a transflective plate, a retardation film (a half wavelength plate and a quarter wavelength plate included), and a viewing angle compensation film, which may be used for formation of a liquid crystal display etc. These are used in practice as an optical film, or as one layer or two layers or more of optical layers laminated with polarizing film.

Although an optical film with the above described optical layer laminated to the polarizing film may be formed by a method in which laminating is separately carried out sequentially in manufacturing process of a liquid crystal display etc., an optical film in a form of being laminated beforehand has an outstanding advantage that it has excellent stability in quality and assembly workability, etc., and thus manufacturing processes ability of a liquid crystal display etc. may be raised. Proper adhesion means, such as a pressure-sensitive adhesive layer, may be used for laminating. On the occasion of adhesion of the above described polarizing film and other optical layers, the optical axis may be set as a suitable configuration angle according to the target retardation characteristics etc.

The pressure-sensitive adhesive layer-attached polarizing film of the present invention is preferably used to form various types of image displays such as liquid crystal displays. Liquid crystal displays may be formed according to conventional techniques. Specifically, liquid crystal displays are generally formed by appropriately assembling a liquid crystal cell and the pressure-sensitive adhesive layer-attached polarizing film and optionally other component such as a lighting system and incorporating a driving circuit according to any conventional technique, except that the pressure-sensitive adhesive layer-attached optical polarizing of the present invention is used. Any type of liquid crystal cell may also be used such as a TN type, an STN type, a π type a VA type and IPS type.

Suitable liquid crystal displays, such as liquid crystal display with which the pressure-sensitive adhesive layer-attached optical polarizing has been located at one side or both sides of the liquid crystal cell, and with which a backlight or a reflective plate is used for a lighting system may be manufactured. In this case, the pressure-sensitive adhesive layer-attached optical polarizing may be installed in one side or both sides of the liquid crystal cell. When installing the optical films in both sides, they may be of the same type or of different type. Furthermore, in assembling a liquid crystal display, suitable parts, such as diffusion layer, anti-glare layer, antireflection film, protective plate, prism array, lens array sheet, optical diffusion sheet, and backlight, may be installed in suitable position in one layer or two or more layers.

EXAMPLES

The present invention is more specifically described by the examples below, which are not intended to limit the scope of the present invention. In each example, parts and % are all by weight. Unless otherwise stated below, the conditions of room temperature standing are 23° C. and 65% RH in all the cases.

<Measurement of Weight Average Molecular Weight of (Meth)Acryl-Based Polymer>

The weight average molecular weight (Mw) of the (meth) acryl-based polymer was measured by GPC (Gel Permeation Chromatography).

Analyzer: HLC-8120GPC manufactured by TOSOH CORPORATION

Columns: $G7000H_{XL}+GMH_{XL}+GMH_{XL}$ manufactured by TOSOH CORPORATION

Column size: each 7.8 mmϕ×30 cm, 90 cm in total

Column temperature: 40° C.

Flow rate: 0.8 ml/minute

Injection volume: 100 μl

Eluent: tetrahydrofuran

Detector: differential refractometer (RI)

Standard sample: polystyrene

<Iodine Content in Polarizer>

Iodine content (iodine and/or iodide ion content) in the polarizer is as follows. Fluorescent X-ray intensities of polarizers containing predetermined potassium iodide contents were measured, and a relational expression was derived from the iodine contents and fluorescent X-ray intensities. An iodine-based polarizer, whose iodine content is unknown, was subject to measuring the fluorescent X-ray intensity, then the iodine content was calculated from the measured value of the fluorescent X-ray intensity in accordance with the relational expression.

<Preparation of Polarizing Film (1)>

A process for forming a thin polarizer was performed. In the process, a laminate including an amorphous PET substrate and a 9 μm thick PVA layer formed thereon was first subjected to auxiliary in-air stretching at a stretching temperature of 130° C. to form a stretched laminate. Subsequently, the stretched laminate was immersed for 60 seconds in a dyeing liquid containing 100 parts by weight of water, 0.1 parts by weight of iodine, and 0.7 parts by weight of potassium iodide, so that a dyed laminate was obtained. Then, the colored laminate was subjected to stretching in an aqueous boric acid solution at a stretching temperature of 65° C. to a total stretch ratio of 5.94 times, so that an optical film laminate was obtained, which had a 4 μm thick PVA layer stretched together with the amorphous PET substrate. Such two-stage stretching successfully formed an optical film laminate having a 4 μm thick PVA layer, which was formed on the amorphous PET substrate, contained highly oriented PVA molecules, and formed a highly-functional polarizing layer in which iodine absorbed by the dyeing formed a polyiodide ion complex oriented highly in a single direction. An 40 μm thick saponified triacetylcellulose film was further attached to the surface of the polarizing layer of the optical film laminate, while a polyvinyl alcohol-based adhesive was applied to the surface. Subsequently, the amorphous PET substrate was peeled off, so that a polarizing film including the thin iodine-based polarizer and the transparent protective film provided only on one side of the polarizer was obtained. Hereinafter, this product will be referred to as polarizing film (1). The thin iodine-based polarizer had an iodine content of 5.1%.

(Preparation of Polarizing Film (2))

An 80 μm-thick polyvinyl alcohol film was stretched to 3 times between rolls different in velocity ratio, while it was dyed in a 0.3% iodine solution at 30° C. for 1 minute. The film was then stretched to a total stretch ratio of 6 times, while it was immersed in an aqueous solution containing 4% of boric acid and 10% of potassium iodide at 60° C. for 0.5 minutes. The film was then washed by immersion in an aqueous solution containing 1.5% of potassium iodide at 30° C. for 10 seconds and then dried at 50° C. for 4 minutes to give an iodine-based polarizer with a thickness of 20 μm. A 40-μm-thick saponified triacetylcellulose film was bonded to one side of the polarizer with a polyvinyl alcohol-based adhesive and A 33-μm-thick norbornene-based film was bonded to the other side of the polarizer also with a polyvinyl alcohol-based adhesive, so that a polarizing film including the iodine-based polarizer and the transparent protective films provided on both sides of the polarizer was obtained. Hereinafter, this product will be referred to as polarizing film (2). The iodine-based polarizer had an iodine content of 6.2%.

<Preparation of Polarizing Film (3)>

A polarizing film was prepared in the same operation as in the <Preparation of polarizing film (1)>, except that the time for which the laminate was immersed in the dyeing liquid was changed to 65 seconds. Hereinafter, this product will be referred to as polarizing film (3). The iodine-based polarizer had an iodine content of 5.9%.

<Preparation of Polarizing Film (4)>

A polarizing film was prepared in the same operation as in the <Preparation of polarizing film (1)>, except that the time for which the laminate was immersed in the dyeing liquid was changed to 60 seconds. Hereinafter, this product will be referred to as polarizing film (4). The iodine-based polarizer had an iodine content of 4.1%.

Production Example 1

<Preparation of Acryl-Based Polymer (A-1)>

To a four-neck flask equipped with a stirring blade, a thermometer, a nitrogen gas introducing tube, and a condenser were added a monomer mixture containing 99 parts of butyl acrylate and 1 parts of 4-hydroxybutyl acrylate. Based on 100 parts (solid basis) of the monomer mixture, 0.1 parts of 2,2'-azobisisobutyronitrile as a polymerization initiator was further added together with ethyl acetate. Nitrogen gas was introduced to replace the air, while the mixture was gently stirred, and then a polymerization reaction was performed for 7 hours, while the temperature of the liquid in the flask was kept at about 60° C. Subsequently, ethyl acetate was added to the resulting reaction liquid to adjust the solids content to 30%, so that a solution of an acryl-based polymer (A-1) with a weight average molecular weight of 1,600,000 was obtained.

Production Example 2

<Preparation of Acryl-Based Polymer (A-2)>

A solution of an acryl-based polymer (A2) with a weight average molecular weight of 1,600,000 was prepared as in Production Example 1, except that a monomer mixture containing 99 parts of butyl acrylate and 1 parts of acrylic acid was used instead.

Production Example 3

<Preparation of Aqueous Iodide Solution>

An aqueous solution having an iodine concentration of 0.30% by weight and a potassium iodide concentration of 2.0% by weight was prepared.

Example 1

(Preparation of Pressure-Sensitive Adhesive for Optical Applications)

Based on 100 parts of the solids of the acryl-based polymer (A-1) solution obtained in Production Example 1, 0.1 parts of trimethylolpropane xylylene diisocyanate TAKENATE D110N, manufactured by Mitsui Chemicals, Inc.), 0.3 parts of dibenzoyl peroxide, and 0.075 parts of γ-glycidoxypropylmethoxysilane (KBM-403, manufactured by Shin-Etsu Chemical Co., Ltd.) were added to the acryl-based polymer (A-1) solution, so that an acryl-based pressure-sensitive adhesive solution was obtained.

(Preparation of Pressure-Sensitive Adhesive Layer-Attached Polarizing Film)

Subsequently, the acryl-based pressure-sensitive adhesive solution was uniformly applied to the surface of a silicone release agent-treated polyethylene terephthalate film (separator film) with a fountain coater, and dried for 2 minutes in an air circulation-type thermostatic oven at 155° C., so that a 20 μm thick pressure-sensitive adhesive layer was formed on the surface of the separator film. Subsequently, the pressure-sensitive adhesive layer was transferred from the separator film to a polarizer side of the one-side protected polarizing film (1) prepared as described above, so that a pressure-sensitive adhesive layer-attached polarizing film was obtained.

Examples 2 to 12 and Comparative Examples 1 to 2

Pressure-sensitive adhesive layer-attached polarizing films were prepared as in Example 1, except that in the preparation of the pressure-sensitive adhesive for optical applications, the amount of each component was changed as shown in Table 1 and that in the preparation of the pressure-sensitive adhesive layer-attached polarizing film, the type of the polarizing film was changed as shown in Table 1. In Examples 8 and 9, 0.1 parts of the aqueous iodine solution prepared in Production Example 3 was added in addition to the crosslinking agent and the silane coupling agent in the process of preparing the pressure-sensitive adhesive for optical applications.

The pressure-sensitive adhesive layer-attached polarizing film obtained in each of the examples and the comparative examples was evaluated as described below. The results of the evaluation are shown in Table 1.

<Analysis of Iodine Using ESCA>

The iodine content (iodine and/or iodide ion content (atomic %)) of the pressure-sensitive adhesive layer obtained in each example was measured using ESCA.

The measurement method using ESCA is shown below.
System: Quantum 2000 manufactured by ULVAC-PHI, Inc.
X-ray source: monochrome Al Kα
X-ray setting: 200 μmϕ [30 W (15 kV)]
Photoelectron take-off angle: 45° with respect to the sample surface
Neutralization conditions: using a combination of a neutralization gun and an Ar ion gun (neutralization mode)
Acceleration voltage (raster size) of Ar ion gun: 1 kV (2 mm×2 mm)
Ar ion gun etching rate (calculated in terms of $SiO_2$ etching rate): about 2 nm/minute
Sample preparation: The sample (pressure-sensitive adhesive layer) was cut into an about 10 mm square piece. The sample piece was fixed on the sample mount with a Mo plate pressed against it.
Evaluation method: The sample piece was subjected to analysis in the direction of its depth (depth profile analysis using Ar ion etching) in which the element ratio (atomic %) was calculated at each depth level.

<Analysis of iodine using TOF-SIMS5>

The iodine content (iodine and/or iodide ion content) of the pressure-sensitive adhesive layer obtained in each example was measured using TOF-SIMS5 manufactured by ION-TOF GmbH. The measurement method is shown below.

Sample preparation: The sample (pressure-sensitive adhesive layer) was cut into a 1 cm square piece. The sample piece was subjected to the measurement after frozen and then subjected to precision oblique cutting.

The measurement conditions were as follows.
Applied primary ion: $Bi_3^{2+}$
Primary ion acceleration voltage: 25 kV
Measurement area: 300 to 350 μm square The iodine content of the pressure-sensitive adhesive layer of each example was indicated using the ratio ($I^-$/$C_3H_3O_2^-$) of the intensity of the iodine-derived secondary ion ($I^-$) to the intensity of the butyl acrylate-derived secondary ion ($C_3H_3O_2^-$).

<Surface Resistance (Initial)>

After the separator film was peeled off from the pressure-sensitive adhesive layer-attached polarizing film, the surface resistance (Q/square) of the surface of the pressure-sensitive adhesive was measured using MCP-HT450 manufactured by Mitsubishi Chemical Analytech Co., Ltd.

<Evaluation of Static Electricity-Induced Unevenness>

The prepared pressure-sensitive adhesive layer-attached polarizing film was cut into a piece with a size of 100 mm×100 mm, which was bonded to a liquid crystal panel. The panel was placed on a backlight with a brightness of 10,000 cd, and the orientation of the liquid crystal was disturbed using 5 kV static electricity produced by an electrostatic generator, ESD, (ESD-8012A, manufactured by Sanki Electronic Industries Co., Ltd.). The time required for recovery from the orientation failure-induced display failure was measured using an instantaneous multichannel photodetector system (MCPD-3000, manufactured by Otsuka Electronics Co., Ltd.), and evaluated according to the criteria below.

⊙: Display failure was eliminated in a time of less than one second.
○: Display failure was eliminated in a time of one second to less than 10 seconds.
×: Display failure was eliminated in a time of 10 seconds or more.

<Durability>

The separator film was peeled off from the pressure-sensitive adhesive layer-attached polarizing film, and the polarizing film was bonded to a 0.7 mm thick non-alkali glass plate (1737, manufactured by Corning Incorporated) using a laminator. Subsequently, the laminate was autoclaved at 50° C. and 0.5 MPa for 15 minutes, so that the pressure-sensitive adhesive layer-attached polarizing film was completely bonded to the non-alkali glass plate. Subsequently, the laminate was stored in a heating oven at 80° C. and 90° C. (heating), and stored in a thermo-hygrostat under the conditions of 60° C./90% RH (humidification), respectively, and after 500 hours, the presence or absence of peeling of the polarizing film was evaluated according to the criteria below.

⊙: No peeling was detected at all.
○: Peeling was detected at an invisible level.
Δ: Visible small peeling was detected.
×: Significant peeling was detected.

TABLE 1

| | Pressure-sensitive adhesive for optical applications | | | | | | | | | | | |
|---|---|---|---|---|---|---|---|---|---|---|---|---|
| | Acryl-based polymer (A) | | Aqueous iodine solution (B) | Ionic compound (C) | | Antioxidant (D) | | Crosslinking agent (E) | | | | Silane coupling agent (F) | |
| | Type | Parts | Parts | Type | Parts | Type | Parts | Type | Parts | Type | Parts | Type | Parts |
| Example 1 | A-1 | 100 | | | | | | E-1 | 0.3 | E-2 | 0.1 | F-1 | 0.2 |
| Example 2 | A-1 | 100 | | C-1 | 0.3 | | | E-1 | 0.3 | E-2 | 0.1 | F-1 | 0.2 |
| Example 3 | A-1 | 100 | | C-1 | 0.5 | | | E-1 | 0.3 | E-2 | 0.1 | F-1 | 0.2 |
| Example 4 | A-1 | 100 | | C-1 | 1 | | | E-1 | 0.3 | E-2 | 0.1 | F-1 | 0.2 |
| Example 5 | A-1 | 100 | | C-2 | 0.5 | | | E-1 | 0.3 | E-2 | 0.1 | F-1 | 0.2 |
| Example 6 | A-1 | 100 | | | | D-1 | 0.3 | E-1 | 0.3 | E-2 | 0.1 | F-1 | 0.2 |
| Example 7 | A-1 | 100 | | C-1 | 0.5 | D-1 | 0.3 | E-1 | 0.3 | E-2 | 0.1 | F-1 | 0.2 |
| Example 8 | A-1 | 100 | 0.1 | | | | | E-1 | 0.3 | E-2 | 0.1 | F-1 | 0.2 |
| Example 9 | A-1 | 100 | 0.1 | | | | | E-1 | 0.3 | E-2 | 0.1 | F-1 | 0.2 |
| Example 10 | A-2 | 100 | | | | | | E-1 | 0.3 | E-2 | 0.1 | F-1 | 0.2 |
| Example 11 | A-1 | 100 | | C-1 | 0.5 | | | E-1 | 0.3 | E-2 | 0.1 | F-1 | 0.2 |
| Example 12 | A-1 | 100 | | C-1 | 0.5 | | | E-1 | 0.3 | E-2 | 0.1 | F-1 | 0.2 |
| Comparative Example 1 | A-1 | 100 | | | | | | E-1 | 0.3 | E-2 | 0.1 | F-1 | 0.2 |

TABLE 1-continued

| | | | | | | | | | | | |
|---|---|---|---|---|---|---|---|---|---|---|---|
| Comparative Example 2 | A-1 | 100 | | C-1 | 0.5 | | E-1 | 0.3 | E-2 0.1 | F-1 | 0.2 |

| | Polarizing film | | Content of iodine and/or iodide ions in pressure-sensitive adhesive layer | | Evaluations | | | | |
|---|---|---|---|---|---|---|---|---|---|
| | | | | | | Static electricity-induced unevenness | Durability | | |
| | Type | Content (wt %) of iodine and/or iodide ions in polarizer | ESCA atomic % atomic % | TOF-SIMS I⁻/C₃H₃O₂⁻ | Surface resistance Ω/□ | ESD gun test | 80° C. | 90° C. | 60° C./ 90% RH |
| Example 1 | Polarizing film (1) | 5.1 | 0.1 | 0.21 | $5.0 \times 10^{12}$ | ○ | ⊙ | ○ | ⊙ |
| Example 2 | Polarizing film (1) | 5.1 | 0.12 | 0.22 | $4.2 \times 10^{12}$ | ○ | ⊙ | ○ | ⊙ |
| Example 3 | Polarizing film (1) | 5.1 | 0.11 | 0.21 | $3.0 \times 10^{12}$ | ⊙ | ⊙ | ○ | ⊙ |
| Example 4 | Polarizing film (1) | 5.1 | 0.1 | 0.22 | $8.0 \times 10^{11}$ | ⊙ | ⊙ | ○ | ○ |
| Example 5 | Polarizing film (1) | 5.1 | 0.11 | 0.22 | $9.2 \times 10^{11}$ | ⊙ | ⊙ | ○ | ⊙ |
| Example 6 | Polarizing film (1) | 5.1 | 0.11 | 0.23 | $5.2 \times 10^{12}$ | ⊙ | ⊙ | ⊙ | ⊙ |
| Example 7 | Polarizing film (1) | 5.1 | 0.1 | 0.25 | $3.1 \times 10^{12}$ | ⊙ | ⊙ | ⊙ | ⊙ |
| Example 8 | Polarizing film (1) | 5.1 | 0.12 | 0.86 | $5.5 \times 10^{12}$ | ○ | ○ | ○ | ○ |
| Example 9 | Polarizing film (2) | 6.2 | 0.11 | 0.34 | $8.1 \times 10^{12}$ | ○ | ○ | ○ | ○ |
| Example 10 | Polarizing film (1) | 5.1 | 0.1 | 0.24 | $5.0 \times 10^{12}$ | ⊙ | ⊙ | ○ | ○ |
| Example 11 | Polarizing film (3) | 5.9 | 0.14 | 0.72 | $2.4 \times 10^{12}$ | ⊙ | ⊙ | ○ | ⊙ |
| Example 12 | Polarizing film (4) | 4.1 | 0.05 | 0.08 | $4.1 \times 10^{12}$ | ○ | ⊙ | ○ | ⊙ |
| Comparative Example 1 | Polarizing film (2) | 6.2 | 0 | 0 | $>1.0 \times 10^{13}$ | X | ⊙ | ○ | ⊙ |
| Comparative Example 2 | Polarizing film (2) | 6.2 | 0 | 0 | $>1.0 \times 10^{13}$ | X | ⊙ | ○ | ⊙ |

Concerning the ionic compound (C) shown in Table 1, "C-1" represents 1-ethyl-1-methylpyrrolidinium bis(trifluoromethanesulfonyl)imide and "C-2" lithium bis(trifluoromethanesulfonyl)imide.

Concerning the antioxidant (D), "D-1" represents Igranox 1010 manufactured by BASF.

Concerning the crosslinking agent (E), "E-1" represents an isocyanate crosslinking agent manufactured by Mitsui Takeda Chemicals, Inc. (Takenate D110N, trimethylolpropane xylylene diisocyanate) and "E-2" benzoyl peroxide manufactured by NOF CORPORATION (NYPER BMT).

Concerning the silane coupling agent (F), "F-1" represents KBM403 manufactured by Shin-Etsu Chemical Co., Ltd.

What is claimed is:

1. A pressure-sensitive adhesive layer-attached optical film, comprising an optical film; and a pressure-sensitive adhesive layer for optical applications provided on at least one side of the optical film, wherein
the optical film is a polarizing film,
the polarizing film has a transparent protective film only on one side of a polarizer,
the pressure-sensitive adhesive layer for optical applications is provided on the polarizer opposite to a side on which the transparent protective film is provided,
the pressure-sensitive adhesive layer for optical applications is made from a pressure-sensitive adhesive for optical applications comprising a base polymer (A), wherein the base polymer (A) is a (meth)acryl-based polymer comprising an alkyl (meth)acrylate monomer unit, and
the pressure-sensitive adhesive layer for optical applications of the pressure-sensitive adhesive layer-attached optical film for optical applications comprises 0.02 to 1 atomic % of iodine and/or iodide ions (B),
wherein the polarizing film is an iodine-based polarizing film comprising an iodine-based polarizer and wherein the iodine-based polarizer contains iodine and/or iodide ions (B), and
wherein the (meth)acryl-based polymer comprises butyl (meth)acrylate as the alkyl (meth)acrylate monomer unit, and
wherein the content of the iodine and/or iodide ions (B) of the pressure-sensitive adhesive layer for optical applications is such that the ratio of the iodine and/or iodide ions (B) to a butyl (meth)acrylate-derived ion is from 0.01 to 3.

2. The pressure-sensitive adhesive layer-attached optical film according to claim 1, wherein the base polymer (A) comprises a hydroxyl group.

3. The pressure-sensitive adhesive layer-attached optical film according to claim 1, wherein the (meth)acryl-based polymer comprises the alkyl (meth)acrylate monomer unit and a hydroxyl group-containing monomer unit.

4. The pressure-sensitive adhesive layer-attached optical film according to claim 1, wherein the base polymer (A) comprises a carboxyl group.

5. The pressure-sensitive adhesive layer-attached optical film according to claim 1, wherein the (meth)acryl-based polymer comprises the alkyl (meth)acrylate monomer unit and a carboxyl group-containing monomer unit.

6. The pressure-sensitive adhesive layer-attached optical film according to claim 1, wherein the pressure-sensitive adhesive for optical applications further comprises an ionic compound (C).

7. The pressure-sensitive adhesive layer-attached optical film according to claim 6, wherein the ionic compound (C) is an alkali metal salt and/or an organic cation-anion salt.

8. The pressure-sensitive adhesive layer-attached optical film according to claim 1, wherein the pressure-sensitive adhesive for optical applications further comprises an antioxidant (D).

9. The pressure-sensitive adhesive layer-attached optical film according to claim 1, wherein the pressure-sensitive adhesive for optical applications further comprises a crosslinking agent (E).

10. The pressure-sensitive adhesive layer-attached optical film according to claim 1, wherein the pressure-sensitive adhesive for optical applications further comprises a silane coupling agent (F).

11. The pressure-sensitive adhesive layer-attached optical film according to claim 1, wherein the iodine-based polarizer contains 3 to 10% by weight of the iodine and/or iodide ions (B).

12. An image display device, comprising at least one piece of the pressure-sensitive adhesive layer-attached optical film according to claim 1.

* * * * *